United States Patent [19]

Chan et al.

[11] Patent Number: 5,280,613

[45] Date of Patent: Jan. 18, 1994

[54] ANDF INSTALLER USING THE HPCODE-PLUS COMPILER INTERMEDIATE LANGUAGE

[75] Inventors: Paul Chan, Cupertino; Manoj Dadoo; Karl Pettis, both of San Jose; Vatsa Santhanan, Sunnyvale, all of Calif.

[73] Assignee: Hewlett-Packard Company, Palo Alto, Calif.

[21] Appl. No.: 542,922

[22] Filed: Jun. 25, 1990

[51] Int. Cl.$^5$ .............................................. G06F 9/45
[52] U.S. Cl. ............................. 395/700; 364/DIG. 1; 364/280.4
[58] Field of Search ................. 364/DIG. 1; 395/700

[56] References Cited

U.S. PATENT DOCUMENTS

| | | |
|---|---|---|
| 4,667,290 | 5/1987 | Goss et al. |
| 4,672,532 | 6/1987 | JongeVos ...................... 364/DIG. 1 |
| 4,992,931 | 2/1991 | Hirasawa ..................... 364/DIG. 1 |
| 5,179,703 | 1/1993 | Evans .................................. 395/700 |

FOREIGN PATENT DOCUMENTS 0463583 1/1992 European Pat. Off.
0464525 1/1992 European Pat. Off.

OTHER PUBLICATIONS

Communications of the Association for Computing Machinery. vol. 26, No. 9, Sep. 1983, New York US pp. 654–660.
Andrew S. Tanenbaum et al. 'A practical tool kit for making portable compilers'.
Open Software Foundation, *Request for Technology: Architecture-Netural Distribution Format*, No Date.
Sites et al., *Universal P-code Definition, Version 0.3* Department of Electrical Engineering and Computer Sciences, University of California at San Diego, Jul. 1979.
Gerring et al. *A Universal P-code for the S-1 Project*, Technical Note No. 159, Stanford University, Aug. 1979.
Sites et al., *Machine-Independent Pascal Optimizer Project: Final Reports*, University of California at San Diego, Nov. 1979.
Nye, *Uncode: An Intermediate Language for Pascal\* and Fortran*, Feb. 16, 1980.
McWilliams, "Digital's Architecture Gamble," pp. 14-24, *Datamation*, Mar. 1, 1989.
Sussman, "OSF Eyes Shrink-Wrap RFT," *UNIX Today*, Apr. 3, 1990.

*Primary Examiner*—Thomas M. Heckler
*Attorney, Agent, or Firm*—Roland I. Griffin; Alan H. Haggard

[57] ABSTRACT

A computer software compiler system and method for distributing a machine independent computer program, created on a native computer platform, to heterogeneous target computer platforms. The system comprises installer components which exist on heterogeneous target computer platforms. The installers receive a compiler intermediate representation of the machine independent computer program. The compiler intermediate representation is architecture neutral and represents an architecture neutral distribution format. The installers translate the compiler intermediate representation to object code representations according to an HPcode-Plus compiler intermediate language. The installers operate in a machine dependent manner such that the object code representations are architecture dependent, or machine dependent, on the target computer platforms.

26 Claims, 27 Drawing Sheets

| Class | Instruction | Description |
|---|---|---|
| Passive Opcode | NOP<br>COMM<br>LOC<br>OPTN | No-operation<br>Comment<br>Location<br>Option |
| Load Opcode | LOD<br>LDC<br>CLDC<br>LDP<br>LDA<br>IXE<br>IXF<br>ILOD | Load<br>Load Constant<br>C Load Constant<br>Load Procedure Entry<br>Load Address<br>Index an Element<br>Index a Field<br>Indirect Load |
| Store Opcode | ISTR<br>INST<br>STR<br>STFN<br>LDL<br>LCA | Indirect Store<br>Indirect Non-destructive Store<br>Store<br>Store Function Result<br>Load label<br>Load Constant Address |
| Binary Opcode<br>  Arithmetic | ADD<br>SUB<br>MPY<br>DIV<br>REM | Add<br>Subtract<br>Multiply<br>Divide<br>Remainder |
|   Logical | AND<br>IOR<br>XOR<br>SHFT | Logical And<br>Inclusive Or<br>Exclusive OR<br>Shift |
|   Relational | EQU<br>GEQ<br>GRT<br>LEQ<br>LES<br>NEQ | Equal to<br>Greater than or Equal to<br>Greater than<br>Less than or Equal to<br>Less than<br>Not Equal to |

FIG. 3A

| Class | Instruction | Description |
|---|---|---|
| Unary Opcode | CVT<br>INC<br>NEG<br>NOT<br>RND<br>ICVT<br>ACVT | Convert<br>Increment<br>Negate<br>Not<br>Round<br>Integral Convert<br>Arithmetic Convert |
| Control Opcode | FJP<br>TJP<br>UJP<br>CSJP<br>CTAB<br>CEXP<br>RET<br>ENT<br>END<br>LAB<br>CSEP<br>CEND | False Jump<br>True Jump<br>Unconditional Jump<br>Case Jump<br>Case Table<br>Conditionally Evalue Expression<br>Return<br>Procedure Entry<br>Procedure End<br>Label<br>Conditional Evaluation Separator<br>Conditional Evaluation End |
| Procedure Call Opcode | CUP<br>ICUP<br>MST<br>PAR | Call User Procedure<br>Indirect Call User Procedure<br>Mark Stack<br>Parameter |

FIG. 3B

| Class | Instruction | Description |
|---|---|---|
| Stack Manipulation Opcode | DUP<br>DEL<br>SWP<br>ROT | Duplicate<br>Delete<br>Swap<br>Rotate |
| Special Opcode | MCAL<br>SYM<br>INIT | Marco Call<br>Symbol Table<br>Initialize static data area |

FIG. 3C

| |
|---|
| Figure 3A |
| Figure 3B |
| Figure 3C |

FIG. 3D

| Type | Description |
|---|---|
| TYPE_SCOMPLEX | short complex, pair of TYPE_REAL |
| TYPE_DCOMPLEX | double complex, pair of TYPE_DOUBLE |
| TYPE_LCOMPLEX | long double complex, pair of TYPE_LONGREAL |
| TYPE_PACKED_DECIMAL | packed decimal |
| TYPE_ASCII_DECIMAL | ASCII decimal |
| TYPE_INT1 | 1 byte signed integer |
| TYPE_INT2 | 2 byte signed integer |
| TYPE_INT4 | 4 byte signed integer |
| TYPE_REAL4 | 4 byte real |
| TYPE_REAL8 | 8 byte real |
| TYPE_REAL16 | 16 byte real |
| TYPE_LOGICAL1 | 1 byte unsigned integer |
| TYPE_LOGICAL2 | 2 byte unsigned integer |
| TYPE_LOGICAL4 | 4 byte unsigned integer |

FIG. 4A

| SYM Kind | Description |
|---|---|
| KIND_ENTRY | Multiple entry point procedure entry |
| KIND_COMMON | Common block |
| KIND_EQUIV | FORTRAN equivalence |
| KIND_COBSTRUCT | COBOL structure |
| KIND_VARIANT | Pascal variant record |
| KIND_SET | Pascal set |

FIG. 4B

| Instruction | Description |
|---|---|
| ABS | computes absolute value. |
| ABT | aborts a program. |
| CAT | concatenates two strings. |
| CHKB | checks operand against TRUE or FALSE to determine whether to raise an error condition. |
| CHKL | checks operand against a limit to determine whether to raise an error condition. |
| CHKN | checks operand against the NIL pointer to determine whether to raise an error condition. |
| CHKR | checks operand against a range to determine whether to raise an error condition. |
| CSFT | does a circular shift. |
| EQUF | compares two strings for equal relation with fill characters. |
| EQUT | compares two strings for equal relation using a translation table. |
| GEQF | compares two strings for greater-than-or-equal-to relation with fill characters. |
| GEQT | compares two strings for greater-than-or-equal to relation using a translation table. |
| GET | gets a piece of dynamic storage. |
| GRTF | compares two strings for greater-than relation with fill characters. |
| GRTT | compares two strings for greater-than relation with a translation table. |
| ICPE | calls a procedure indirectly with an environment descriptor. |
| LCA | loads an address of an constant. |
| LDL | loads an address of a label. |
| LEQF | compares two strings for less-than-or-equal-to relation with fill characters |
| LEQT | compares two strings for less-than-or-equal-to relation using a translation table. |
| LESF | compares two strings for less-than relation with fill characters. |
| LEST | compares two strings for less-than relation using a translation table. |
| LSFT | does a logical shift. |
| MAX | computes the maximum of two operands. |
| MIN | computes the minimum of two operands. |
| MOD | computes a modulo of two operands. |
| MOVF | does a string assignment with fill characters |

FIG. 4C1

| Instruction | Description |
|---|---|
| NEQF | compares two strings for not-equal relation with fill characters. |
| NEQT | compares two strings for not-equal relation using a translation table. |
| ODD | checks whether an operand is odd or even. |
| REL | release the dynamic storage allocated by a previous GET instruction. |
| RIPL | does a string assignment with ripple effect when source and target overlap. |
| RIPW | does a sgring assignment with ripple effect while a specified condition is satisfied. |
| SCNU | scans a string until a pattern is encountered and returns the number of bytes scanned. |
| SCNW | scans a string while a pattern is encountered and returns the number of bytes matched. |
| TRAN | performs an in-place translation of a string using a translation table. |
| TYP | does a passive type conversion. |

FIG. 4C2

| |
|---|
| Figure 4C1 |
| Figure 4C2 |

FIG. 4C3

| Instruction | Description |
|---|---|
| CHKV | checks the operand against a particular value to determine whether to raise an error condition. |
| DPAR | prepares an OUT-only parameter before a procedure call. |
| DUP2 | duplicates two elements on the top of the expression stack. |
| DUPR | prepares an IN-only parameter following a procedure call. |
| ENDM | ends a module. |
| ETRY | ends a try recover block. |
| EXPP | exports a procedure. |
| EXPV | exports a variable to another module. |
| IMPP | imports a procedure. |
| IMPV | imports a variable from another module. |
| LEC | loads an escapecode. |
| LESC | performs a local escape. |
| MODL | signals the beginning of a module. |
| RNGE | performs a range checking operation. |
| LGET | get local dynamic storage. |
| LREL | release local dynamic storage. |
| NESC | performs a non-local escape. |
| REC | signals the end of a try block and the start of a recover block. |
| TRY | signals the beginning of a try block. |
| UPAR | receives OUT or IN OUT parameter after a procedure call. |
| UTRY | reverses the effect of a TRY operation and branches to a label. |

FIG. 4D

| Instruction | Description |
|---|---|
| CSGN | compares signs for equality. |
| ENDP | ends a COBOL paragraph. |
| GETS | gets the sign of an external decimal digit. |
| MVRF | does a string assignment, right justified with padding on the left. |
| OVPN | overpunches an external decimal digit. |
| PARC | performs a COBOL paragraph call. |
| STRP | strips the sign of an external decimal number. |

FIG. 4E

| Instruction | Description |
|---|---|
| BDP | deposits a string of bits into an item. Used for MIL-STD MVBITS function. |
| BRST | sets a string of bits to zero. Used for MIL-STD IBCLR function. |
| BSET | sets a string of bits to 1. Used for MIL-STD IBSET function. |
| BTST | tests a bit. Used for MIL-STD BTEST function. |
| BXT | extracts a string of bit from an item. Used for MIL-STD IBITS function. |
| C3JP | performs a 3-way jump depending on the condition. Used for FORTRAN arithmetic IF statement. |
| LDL | loads the address of a label. Used for FORTRAN assigned GOTO statement. |
| VJP | does a jump using an address of a label as an operand. |

FIG. 4F

| Instruction | Description |
|---|---|
| ADJ | adjusts the size of a set. |
| DIF | computes difference of two sets. |
| GOOB | go to a label which is not local. |
| INN | checks if an element is in a set. |
| INT | performs a set intersection. |
| LDE | loads an environment descriptor for lexically scope languages like PASCAL. |
| LDPE | loads an procedure descriptor for lexically scope languages like PASCAL. |
| MUS | constructs a set. |
| SEQU | performs a set equality test. |
| SGS | constructs a set with a singleton. |
| SHI | checks the set for elements greater than a high bound value. |
| SINC | performs a set inclusion test. |
| SLOW | checks the set for elements less than a lower bound value. |
| SNEQ | performs a set nonequality test. |
| UNI | performs a set union. |

FIG. 4G

| HPcode Plus Data Type | Description |
|---|---|
| TYPE_BOOLEAN | True/false or LOGICAL |
| TYPE_CHAR | Character, not sign extended when converted to TYPE_INT |
| TYPE_SCHAR | Character, sign extended when converted to TYPE_INT |
| TYPE_SHORTINT | Signed short integer |
| TYPE_INT | Signed integer |
| TYPE_LONGINT | Signed long integer |
| TYPE_UNS_SHORTINT | Unsigned short integer |
| TYPE_UNS_INT | Unsigned integer |
| TYPE_UNS_LONGINT | Unsigned long integer |
| TYPE_REAL | Float real |
| TYPE_DOUBLE | Double real |
| TYPE_LONGREAL | Long double real |
| TYPE_ANY_PTR | Address for unknown type data object |
| TYPE_VOID | Void type for function |

FIG. 5

| ANSI-C DATA TYPE | HPCODE-PLUS DATA TYPE |
|---|---|
| Boolean | TYPE_BOOLEAN |
| Character | TYPE_CHAR, TYPE_SCHAR |
| Signed integers | TYPE_SHORTINT, TYPE_INT, TYPE_LONGINT |
| Unsigned integers | TYPE_UNS_SHORTINT, TYPE_UNS_INT, TYPE_UNS_LONGINT |
| Floating Point | TYPE_REAL, TYPE_DOUBLE, TYPE_LONGREAL |
| Data Pointer or Address | KIND_POINTER SYM type |
| Enumerated | KIND_ENUM SYM type |
| Function Pointer | KIND_FUNC_PTR SYM type |
| Array | KIND_ARRAY SYM type |
| Structure | KIND_STRUCT SYM type |
| Union | KIND_UNION SYM type |

FIG. 6

| <sym kind> | Description |
|---|---|
| KIND_POINTER | define data pointer type |
| KIND_ENUM | define enumeration type |
| KIND_SUBRANGE | define subrange type |
| KING_ARRAY | define array type |
| KIND_STRUCT | define structure type |
| KIND_UNION | define union type |
| KIND_FIELD | define structure field |
| KIND_FUNC_PTR | define function pointer type |
| KIND_MODIFIER | define additional attribute such as volatile or constant |

FIG. 7

```
<COMM & OPTN instructions>
<LOC instructions>
<COMM & OPTN instructions>
<SYM & INIT instructions for variables/types/constants/
    functions>
<SYM or KIND_FUNCTION instruction>
ENT
<LOC instructions>
<other instructions>
<SYM & INIT instructions for variables/types/constants/
    functions>
<other instructions>
...
...
END
<SYM or KIND_END>
...
<LOC instructions>
<COMM & OPTN instructions>
<SYM & INIT instructions for variables/types/constants/
    functions>
ENT
<LOC instructions>
<other instructions>
<SYM or INIT instructions for global variables/types/
    constants/functions>
<other instructions>
...
END
<SYM of KIND_END>
<COMM & OPTN instructions>
```

FIG. 8

| Category | <symid> | Description |
|---|---|---|
| Void | TYPE_VOID | void type for function |
| Boolean | TYPE_BOOLEAN | true/false or LOGICAL |
| Character | TYPE_CHAR | character, not sign extended when converted to an integer character |
| | TYPE_SCHAR | character, sign extended when converted to an integer |
| Integral | TYPE_SHORTINT | signed short integer |
| | TYPE_INT | signed integer |
| | TYPE_LONGINT | signed long integer |
| | TYPE_UNS_SHORTINT | unsigned short integer |
| | TYPE_UNS_INT | unsigned integer |
| | TYPE_UNS_LONGINT | unsigned long integer |
| Floating | TYPE_REAL | short real |
| | TYPE_DOUBLE | double real |
| | TYPE_LONGREAL | long real |
| Any Ptr | TYPE_ANY_PTR | pointer to a data object of unknown type |

FIG. 9

| Category | <sym kind> | Description |
|---|---|---|
| Types | KIND_POINTER<br>KIND_STRUCT<br>KIND_UNION<br>KIND_ARRAY<br>KIND_ENUM<br>KIND_FUNC_PTR<br>KIND_MODIFIER | define data pointer type<br>define structure type<br>define union type<br>define array type<br>define enumerated type<br>define function ptr type<br>additional attributes for a type |
| Field | KIND_FIELD | define structure field |
| Functions | KIND_FUNCTION<br>KIND_FUNC_DCL<br>KIND_FPARAM | function definition<br>function declaration<br>define formal parameter |
| Variables | KIND_SVAR<br>KIND_DVAR<br>KIND_MEMBER<br><br>KIND_OFFSEOF<br><br>KIND_SIZEOF | define static variable<br>define dynamic variable<br>define member of an enumerated type<br>the offset of a field inside a structure<br>the size of a type |
| Constants | KIND_MAXOF<br>KIND_MINOF<br>KIND_CONST<br>KIND_NEW_CONST | max value of an object<br>min value of an object<br>define constant<br>define a new constant |
| Macro | KIND_MACRO | define a macro |
| End | KIND_END | define end of SYMs |
| Symdebug | KIND_SRCFILE<br><br>KIND_LABEL | provide source file info for symbolic debug<br>provide label info for symbolic debug |

FIG. 10

```
#include<stdio.h>
/*
 * sample program
 */ struct {int i; long j;} x = {1, 10L};

main()
{ char k;
    char s[65536];
    register char *p;
    struct {int i; long j;} y;

int jebl = 0;

while (gets(S) ! = NULL) {
        for (p = s + strlens(S) - 1;
            p >= s && (*p ==''||*p=='\t');
            p-->;
            k = s[strien(s)-1];
            *(++p) = '\0';
            if ((p!=s) || !jebl)
                puts(s);
            jebl = (p==s);
    }
    fflush(stdout);
    exit(0);
}
```

FIG. 14

```
SYM 256 KIND_POINTER 0 TYPE_VOID
SYM 257 KIND_POINTER 0 TYPE_LONGINT
SYM 258 KIND_POINTER 0 TYPE_CHAR
SYM 259 KIND_ARRAY 0 65536 TYPE_CHAR 0
SYM 260 KIND_POINTER 0 TYPE_CHAR
SYM 261 KIND_POINTER 0 TYPE_DOUBLE
SYM 262 KIND_STRUCT 0 263 0
SYM 264 KIND_POINTER 0 262
SYM 265 KIND_ARRAY 0 60 262 0
SYM 266 KIND_POINTER 0 TYPE_CHAR
SYM 267 KIND_POINTER 0 TYPE_LONGINT
SYM 268 KIND_POINTER 0 TYPE_VOID
SYM 269 KIND_STRUCT 0 270 0
SYM 271 KIND_STRUCT 0 272 0
SYM 272 KIND_FIELD TYPE_INT 273 i
SYM 273 KIND_FIELD TYPE_LONGINT 0 J
SYM 270 KIND_FIELD TYPE_INT 274 i
SYM 274 KIND_FIELD TYPE_LONGINT 0 j
SYM 275 KIND_FIELD 260 276 _ptr
SYM 276 KIND_FIELD 260 277 _base
SYM 277 KIND_FIELD TYPE_SHORTINT 278 _flag
SYM 278 KIND_FIELD TYPE_CHAR 0 _file
SYM 279 KIND_SVAR 0 265 1 _iob
SYM 280 KIND_FUNC_DCL 0 TYPE_INT remove
SYM 281 KIND_FUNCT_DCL 0 TYPE_INT rename
SYM 282 KIND_FUNC_DCL 0 264 tmpfile
SYM 283 KIND_FUNC_DCL 0 258 tmpnam
SYM 284 KIND_FUNC_DCL 0 TYPE_INT fclose
SYM 285 KIND_FUNC_DCL 0 TYPE_INT fflush
SYM 286 KIND_FUNC_DCL 0 264 fopen
SYM 287 KIND_FUNC_DCL 0 264 freopen
SYM 288 KIND_FUNC_DCL 0 TYPE_VOID setbuf
SYM 289 KIND_FUNC_DCL 0 TYPE_INT setvbuf
SYM 290 KIND_FUNC_DCL 0 TYPE_INT fprintf
SYM 291 KIND_FUNC_DCL 0 TYPE_INT fscanf
SYM 292 KIND_FUNC_DCL 0 TYPE_INT printf
SYM 293 KIND_FUNC_DCL - TYPE_INT scanf
SYM 294 KIND_FUNC_DCL 0 TYPE_INT sprintf
SYM 295 KIND_FUNC_DCL 0 TYPE_INT sscanf
SYM 296 KIND_FUNC_DCL 0 TYPE_INT vprintf
SYM 297 KIND_FUNC_DCL 0 TYPE_INT vsprintf
SYM 299 KIND_FUNC_DCL 0 TYPE_INT fgetc
SYM 300 KIND_FUNC_DCL 0 258 fgets
SYM 301 KIND_FUNC_DCL 0 TYPE_INT fputc
SYM 302 KIND_FUNC_DCL 0 TYPE_INT fputs
SYM 303 KIND_FUNC_DCL 0 TYPE_INT getc
SYM 304 KIND_FUNC_DCL - TYPE_INT getchar
SYM 305 KIND_FUNC_DCL 0 258 gets
SYM 306 KIND_FUNC_DCL 0 TYPE_INT putc
SYM 307 KIND_FUNC_DCL 0 TYPE_INT putchar
```

FIG. 15A

```
SYM 308 KIND_FUNC_DCL 0 TYPE_INT puts
SYM 309 KIND_FUNC_DCL 0 TYPE_INT ungetc
SYM 310 KIND_FUNC_DCL 0 TYPE_INT fgetpos
SYM 311 KIND_FUNC_DCL 0 TYPE_INT fseek
SYM 312 KIND_FUNC_DCL 0 TYPE_INT fsetpos
SYM 313 KIND_FUNC_DCL 0 TYPE_LONGINT ftell
SYM 314 KIND_FUNC_DCL 0 TYPE_VOID rewind
SYM 315 KIND_FUNC_DCL 0 TYPE_VOID clearerr
SYM 316 KIND_FUNC_DCL 0 TYPE_INT feof
SYM 317 KIND_FUNC_DCL - TYPE_INT ferror
SYM 318 KIND_FUNC_DCL 0 TYPE_VOID perror
SYM 319 KIND_FUNC_DCL 0 TYPE_UNS_INT fread
SYM 320 KIND_FUNC_DCL 0 TYPE_UNS_INT fwrite
SYM 321 KIND_SVAR - 269 0 x
SYM 322 KIND_CONST 1 269 [ 1 10 ]
INIT 321 322
SYM 323 KIND_FUNCTION TYPE_INT 0 main
ENT 323
SYM 324 KIND_DVAR TYPE_CHAR 0 k
SYM 325 KIND_DVAR 259 0 s
SYM 326 KIND_DVAR 258 1 p
SYM 327 KIND_DVAR 271 0 y
SYM 328 KIND_DVAR TYPE_INT 0 jeb1
ISTR
LDC TYPE_INT 0
LDA 328
LAB 0 0
MST
LDA 325
CVT 258
PAR
CUP 305
LDC TYPE_ANY_PTR 0
NEQ FJP 1
LDA 325
CVT 258
PAR
CUP 329
IXE TYPE_CAR
LDC TYPE_INT 1
NEG
IXE TYPE_CHAR
LDA 326
SWP
ISTR
LAB 4 0
LOD 326
LDA 325
CVT 258
GEQ
FJP 3
```

FIG. 15B

```
LOD 326
ILOD
CVT TYPE_INT
LDC TYPE_INT " "
EQU
TJP 5
LOD 326
ILOD
CVT TYPE_INT
LDC TYPE_INT " "
EQU
FJP 3
LAB 5 0
LAB 2 0
LDA 326
DUP
ILOD
DUP
INC -1
ROT
SWP
ISTR
DEL
UJP 4
LAB 3 0
LDA 325
MST
LDA 325
CVT 258
PAR
CUP 329
LDC TYPE_INT 1
SUB
IXE TYPE_CHAR
ILOD
LDA 324
SWP
ISTR
LDC TYPE_CHAR 0
LDA 326
DUP
ILOD
INC 1
INST
SWP
ISTR
LOD 326
LDA 325
CVT 258
NEQ
TJP 7
LDC TYPE_INT 0
LOD 328
```

FIG. 15C

```
NEQ
TJP 6
LAB 7 0
MST
LDA 325
CVT 266
PAR
CUP 308
DEL
LAB 6 0
LOD 326
LDA 325
CVT 28
EQU
CVT TYPE_INT
LDA 328
SWP
ISTR
UJP 0
LAB 1 0
MST
LDA 279
LDC TYPE_INT 1
IXE 262
PAR
CUP 285
DEL
SYM 330 KIND_FUNC_DCL 0 TYPE_INT exit
MST
LDC TYPE_INT 0
PAR
CUP 330
DEL
END 323
SYM 323 KIND_END
```

FIG. 15D

| Figure 15A |
|---|
| Figure 15B |
| Figure 15C |
| Figure 15D |

FIG. 15E

ANDF INSTALLER USING THE HPCODE-PLUS COMPILER INTERMEDIATE LANGUAGE

CROSS-REFERENCE TO OTHER APPLICATIONS

The following pending applications of common assignee contain some common disclosure, and are believed to have effective filing dates identical with that of the present application:

ANDF COMPILER USING THE HPCODE-PLUS COMPILER INTERMEDIATE LANGUAGE Ser. No. 07/543,049, FILED Jun. 25, 1990; and ANDF COMPILER USING THE HPCODE-PLUS COMPILER INTERMEDIATE LANGUAGE Ser. No. 07/543,021, filed Jun. 25, 1990.

BACKGROUND OF THE INVENTION

The present invention relates generally to computer software compiler systems and methods, and specifically to computer software compiler systems and methods for enhanced distribution of computer software.

Ideally, the same version of a computer program could be distributed to heterogeneous computer platforms (heterogeneous computer platforms being computer platforms having different computer architectures and different computer operating systems). The computer program would operate, without modifications, on the heterogeneous computer platforms.

This distribution ideal is desirable for a number of reasons. First, the availability of computer software is enhanced if software is easily distributed. For end-users, easily-distributed computer programs means that their software acquisition and purchasing tasks are simplified. For software vendors, easily-distributed computer programs means their stocking and distribution costs are minimized.

Additionally, for software producers, easily-distributed computer programs are desirable for economic efficiency reasons. Initial development and subsequent maintenance costs would be minimized if a programming team could limit their design, implementation, and maintenance efforts to a single computer program version. Distribution costs would also be minimized if a single computer program version could be marketed to heterogeneous computer platforms.

The ability to reach this distribution ideal depends on two factors: the manner in which software is written and the format in which software is distributed.

Today, software is ordinarily written in a machine dependent manner. For example, software written for an IBM Personal Computer (IBM PC) will often use the function calls that are provided by DOS (Disk Operating System), the IBM PC operating system. Such software is machine dependent because it includes references to specific features (i.e., DOS function calls) of a particular computer platform (i.e., the IBM PC).

Machine dependent software can operate only on its native computer platform (i.e., the computer platform on which it was created). Modifications are necessary for it to operate on other computer platforms. Therefore, machine dependent software is economically inefficient because separate versions of each computer program are required, one for each target computer platform (i.e., a computer platform on which a computer program is meant to operate).

It is possible to write software so that it does not depend on the specific features of any particular computer platform. That is, software that depends neither on the specific hardware nor specific software features of any particular computer platform. Such software is said to be machine independent. Theoretically, machine independent software (or machine independent computer programs) can operate on heterogeneous target computer platforms without any modifications.

But the ability of software to operate on heterogeneous target computer platforms also depends on the manner in which software is distributed (i.e., the format of the software distribution copy). There are two software distribution formats: an architecture neutral distribution format and an architecture dependent distribution format.

A machine independent computer program that is distributed in the architecture dependent distribution format (ADDF) can only operate on its native computer platform. Object and executable code formats are examples of ADDFS. ADDFs are inefficient because multiple versions of the software distribution copy are required, one for each heterogeneous target computer platform.

Conversely, a machine independent computer program that is distributed in the architecture neutral distribution format (ANDF) can operate on any computer platform. Thus, ANDFs are efficient because only one version of the software distribution copy is required, and this version can be distributed without modifications to heterogeneous target computer platforms.

Therefore, the distribution ideal is reached through the combination of machine independent computer programs plus ANDF. That is, the combination of machine independent computer programs plus ANDF produces computer programs that can operate, without any modifications, on heterogeneous computer platforms.

There have been many attempts at defining a working ANDF specification. Perhaps the first attempt was in 1969 with the creation of UNCOL. UNCOL was a compiler intermediate language which had some ANDF features. The creators of UNCOL, however, were not attempting to define an ANDF specification. Thus, UNCOL, while having some ANDF features, was not a complete ANDF specification.

In November 1988, the European Roundtable commissioned Logica to perform an ANDF feasibility study. The Logica study, which was completed in April 1989, reiterated the goals, the requirements, and the impact of ANDF, but did not define a complete ANDF specification.

In April 1989, the Open System Foundation (OSF) solicited proposals, via a Request for Technology (RFT), for an ANDF standard for Unix computer platforms. OSF received over 20 proposals (hereinafter referred to as the "OSF proposals") in response to its RFT.

Generally, ANDF specification proposals are based on one of the four generally accepted ANDF approaches: ANDF Using Source Code; ANDF Using Encrypted Source Code; ANDF Using Tagged Executable Code; and ANDF Using Compiler Intermediate Representation.

The first ANDF approach, ANDF Using Source Code, uses the computer program source code as the software distribution format. Under this approach, machine independent source code is distributed to heterogeneous target computer platforms. At each target computer platform, computer operators use their compilers to compile their source code copies.

The ANDF Using Source Code approach, however, is inherently flawed because proprietary secrets, embedded within the source code, cannot be protected if the source code is used as the ANDF. Therefore, distributing computer programs at the source code level, although being architecturally neutral, is not feasible for most business applications.

The second ANDF approach, ANDF Using Encrypted Source Code, is a variation of the first. Under this approach, encrypted source code is distributed to heterogeneous target computer platforms. The operators at each target computer platform use special compilers to compile their copies of the encrypted source code. These special compilers have two parts, an decrypter and a conventional compiler. The special compilers first decrypt, and then compile, the encrypted source code.

The ANDF Using Encrypted Source Code approach seemingly solves the security problem of the first approach, since embedded proprietary secrets are protected by the encryption process. The security problem is not completely solved, however, because the decrypted source code can be intercepted after decryption by the special compiler. Thus, like the first approach, the ANDF Using Encrypted Source Code approach is inherently flawed because it exposes embedded proprietary secrets to the public.

Under the third ANDF approach, ANDF Using Tagged Executable Code, the software distribution format is composed of a first part and a second part. The first part contains executable code in the native computer platform's machine language. The second part contains information concerning the native computer platform's machine language. This second part is called a Key.

Special compilers use the Key to convert the first part of the software distribution copy to executable code for their respective target computer platforms.

This third ANDF approach, however, is inherently flawed because it is not truly architecturally neutral. Instead, it is architecturally biased.

The fourth ANDF approach, ANDF Using Compiler Intermediate Representation, uses a compiler intermediate representation as the software distribution format. To understand this approach, it is necessary to describe some high-level software compiler concepts.

Software compilers are composed of two parts, a front end and a back end. The compiler front end receives computer programs as input. These computer programs are normally written in high level programming languages, such as Pascal, C, and Ada.

The compiler front end scans, parses, and performs semantic analysis on the computer program. In other words, the front end is responsible for language dependent processing of the computer program. After all anguage dependent processing is complete (and if no errors have been found), the front end generates a compiler intermediate representation of the computer program. The compiler intermediate representation is analogous to an assembly language representation of the computer program.

Compiler back ends receive the compiler intermediate representations as input and convert the compiler intermediate representation to object code representations for specific computer platforms.

The object code representations are is then converted to executable code representations by linkers on the target compiler platforms. Linkers are not part of compilers.

Normally, the front end generates compiler intermediate representations in a machine dependent manner. This is particularly true for operations involving memory allocation, data type conversion, and include file processing. Thus, compiler intermediate representations are normally machine dependent and thus unsuitable as an ANDF.

If, however, the front end operates in a machine independent manner, and if the resulting compiler intermediate representation makes no assumptions about the specific architectural features of particular computer platforms, then the compiler intermediate representation is architecturally neutral. Thus, such a compiler intermediate representation is an ANDF.

Under the ANDF Using Compiler Intermediate Representation approach, therefore, an architecture neutral compiler intermediate representation is used as the software distribution format. ANDF Compiler front ends (or "ANDF Producers") are located on native computer platforms and ANDF Compiler back ends (or "ANDF Installers") are located on target computer platforms.

ANDF Producers create compiler intermediate representations of computer programs. These compiler intermediate representations, being architecturally neutral, are distributed to heterogeneous target computer platforms. ANDF Installers install the compiler intermediate representations on target computer platforms. An ANDF Interpreter may be substituted for the ANDF Installer. An ANDF Interpreter directly executes intermediate instructions without first translating them to executable code.

The ANDF Using Compiler Intermediate Representation approach solves the security problems of the first and second ANDF approaches. High-level source code constructs, which encompass the computer program's proprietary secrets, are represented with difficult-to-read low-level instruction sequences. Also, low-level instruction sequences are represented by strings of numbers, rather than mnemonics.

The ANDF Using Compiler Intermediate Representation approach solves the inherent problems of the third ANDF approach, since the ANDF Using Compiler Intermediate Representation approach is truly architecture neutral (i.e., machine independent).

Thus, the ANDF Using Compiler Intermediate Representation approach has no inherent flaws. This ANDF approach, however, presents many difficult design and implementation problems.

Specifically, a compiler intermediate language must be defined so that the ANDF Producer, based on this definition, can produce compiler intermediate representations that are free from the machine dependencies which are normally produced by the application of inherently machine dependent computer operations, such as memory allocation, data type conversion, data folding, and include file processing. These operations are described below.

Additionally, the compiler intermediate language must be defined so that the ANDF Installer, based on this definition, can receive the compiler intermediate representation as input and produce executable code for any target computer platform.

Memory allocation operations are inherently machine dependent because they depend on a particular computer platform's specification for data alignment, data sizes, and data attributes. For example, some computer platforms align integers so that the most significant byte is in the lowest memory address, while others align integers so that the least significant byte is in the lowest memory address. Also, some computer platforms specify integers as being signed and 32 bits wide, while others specify integers as being unsigned and 16 bits wide.

Memory allocation operations are also dependent upon a particular computer platform's data representation scheme. For example, for computer platforms which support the ASCII character set, the string "HELLO" would be represented in memory as the following sequence of hexadecimal bytes: 48 45 4C 4C 4F. However, the string "HELLO" would be represented as a different sequence of hexadecimal bytes in computer platforms which support the EBCDIC character set.

Data type conversion and data folding operations are also inherently machine dependent. For example, in converting a signed short integer (with a value of less than zero) to a standard sized signed integer, some computer platforms will insert all zeroes in front of the most significant digit. Other computer platforms will insert all ones.

Also, the resulting data type of an expression is not always apparent. For example, in the expression y=x+20000+17000, some computer platforms may represent the result of 20000+17000 as an integer, while others may represent the result as a long integer.

Many high level languages, such as C, allow computer programmers to add predefined or often-used code into their programs through the use of include files. Often, these include files include macro operations, which are similar to software procedures and functions. Macros defined on one computer platform may not exist or may exist in different forms on other computer platforms.

Many of the OSF proposals were based on the ANDF Using Compiler Intermediate Representation approach. For the most part, however, the OSF proposals were not completely architecture neutral because they failed to address all the implementation problems described above.

A proposal describing the present invention was submitted in response to the OSF RFT.

The present invention represents an ANDF specification based on the ANDF Using Compiler Intermediate Representation approach. Unlike other ANDF specifications, the present invention is based on the Ucode compiler intermediate language. Additionally, the ANDF specification defined by the present invention is completely architecture neutral.

SUMMARY OF THE INVENTION

The present invention is directed to a computer software compiler system and method for distributing a machine independent computer program, created on a native computer platform, to heterogeneous target computer platforms. Specifically, the present invention is directed to architecture-neutral distribution format (ANDF) installers (hereinafter called "ANDF Installers"). The ANDF Installers are analogous to the back ends of conventional computer software compilers.

The ANDF Installers reside at target computer platforms (or install sites). The target computer platforms are heterogeneous.

The ANDF Installers receive a compiler intermediate representation of the machine independent computer program as input and generate object code representations of the machine independent computer program. The object code representations are architecture dependent, or machine dependent, on the respective target computer platforms on which the ANDF Installers reside.

The compiler intermediate representation is generated at a native computer platform (or a producer site) according to a HPcode-Plus compiler intermediate language. The generation of the compiler intermediate representation is performed in a machine dependent manner according to the HPcode-Plus compiler intermediate language. Thus, machine dependent decisions concerning inherently machine dependent computer operations are not made during the generation of the compiler intermediate representation. Instead, sufficient information is stored in the compiler intermediate representation so that such machine dependent decisions can be made by the ANDF Installers at target computer platforms.

The compiler intermediate representation, therefore, is architecture neutral and represents an architecture neutral distribution format (ANDF). The compiler intermediate representation, being architecture neutral, is distributed to the target computer platforms.

The ANDF Installers at these target computer platforms receive the compiler intermediate representation and, in accordance with the HPcode-Plus compiler intermediate language, generate object code representations of the machine independent computer program. In generating the object code representations, the ANDF Installers make the machine dependent decisions which were deferred from the native computer platform. Thus, the object code representations are architecture dependent, or machine dependent, on the target computer platforms on which the ANDF Installers reside.

Thus, as is clear from the above, the compiler intermediate representation, representing an architecture neutral distribution format, can be distributed to heterogeneous target computer platforms. The ANDF Installers of the present invention can receive the compiler intermediate representation and then generate object code representations for the target computer platforms. Software distribution is enhanced since a single version of the machine independent computer program can execute, with no modifications, on heterogeneous target computer platforms.

Further features and advantages of the present invention will be apparent from the ensuing description with reference to the accompanying drawings to which, however, the scope of the present invention is in no way limited.

BRIEF DESCRIPTION OF THE DRAWINGS

FIGS. 3A, 3B, and 3C are tables listing the instruction classes, instruction mnemonics, operational code (opcode) hex values, and descriptions of the HPcode-Plus compiler intermediate language instruction set for the ANSI-C computer programming language.

FIG. 3D illustrates the manner in which FIGS. 3A, 3B, and 3C are connected.

FIGS. 4A-4G are all associated with instruction classes, instruction mnemonics, operational code (opcode) hex values, and descriptions of the HPcode-Plus compiler intermediate language instructions for programming languages other than the ANSI-C computer programming language.

FIG. 4A is a table listing the symbolic identifiers and descriptions of additional HPcode-Plus predefined data types which support computer programming languages other than ANSI-C.

FIG. 4B is a table listing additional <sym kind> values for the SYM HPcode-Plus instruction which support computer programming languages other than ANSI-C.

FIGS. 4C1 and 4C2 are tables listing additional HPcodePlus operators which support computer programming languages other than ANSI-C.

FIG. 4C3 illustrates the manner in which FIGS. 4C1 and 4C2 are connected.

FIGS. 4D, 4E, 4F, and 4G are tables listing additional HPcode-Plus operators which support the ADA, COBOL, FORTRAN, and PASCAL, respectively, computer programming languages.

FIG. 5 is a table listing HPcode-Plus predefined data types for the ANSI-C computer programming language.

FIG. 6 is a table showing the mapping from ANSI-C data types to HPcode-Plus data types.

FIG. 7 is a table listing values of <sym kind> of a HPcode-Plus instruction SYM for defining data types other than HPcode-Plus predefined data types.

FIG. 8 is a sequence of HPcode-Plus instructions which show the structure of a HPcode-Plus object file.

FIG. 9 is a table listing predefined symbolic identifiers for HPcode-Plus predefined data types for the ANSI-C computer programming language.

FIG. 10 is a table which lists values of <sym kind> of the HPcode-Plus instruction SYM.

FIG. 14 is a partial computer program listing of an example machine independent ANSI-C computer program.

FIGS. 15A, 15B, 15C, and 15D show a sequence of HPcode-Plus instructions which represents a HPcode-Plus translation of the partial computer program listing of FIG. 14.

FIG. 15E illustrates the manner in which FIGS. 15A, 15B, C, and 15D are connected.

DETAILED DESCRIPTION OF THE PREFERRED EMBODIMENTS

TABLE OF CONTENTS

1. ANDF Compiler
2. HPcode-Plus
   2.1. Virtual Machine Model (Expression Stack Model)
   2.2. Memory Model
   2.3. Memory Allocation and Data Types
   2.4. HPcode-Plus Object File
   2.5. HPcode-Plus Instruction Set for ANSI-C
3. ANDF Producer
   3.1. Preprocessor
   3.2. Compiler
       3.2.1. Scanner/Parser
       3.2.2. Semantic Analyzer
       3.2.3. Code Generator
           3.2.3.1. Memory Allocation
           3.2.3.2. Scope, Linkage, and Declaration of Variable
           3.2.3.3. Constants
               3.2.3.3.1. Floating Point and Integer Constants
               3.2.3.3.2. Enumeration Constants
               3.2.3.3.3. Character Constants
           3.2.3.4. Data Conversions
           3.2.3.5. Postfix Expressions
           3.2.3.6. Unary Operations
           3.2.3.7. Other Operations
           3.2.3.8. Folding of Constant Operations
           3.2.3.9. Initialization
           3.2.3.10. Statements
           3.2.3.11. Functions
           3.2.3.12. Example
   3.3. High-Level Optimizer
   3.4. Archiver
4. ANDF Installer
   4.1. Tuple-Generator
   4.2. Low-Level Code Generator
       4.2.1. Instruction Selection
       4.2.2. Memory Allocation
       4.2.3. Symbolic Debug Support
       4.2.4. Optimization Support
       4.2.5. Object File Management
   4.3. Low-Level Optimizer
   4.4. Register Allocator
   4.5. Machine Specific Optimizer
   4.6. Object File Generator

1. ANDF Compiler

The present invention is directed to the standards being promulgated by ANSI for the C programming language (i.e., ANSI-C) and by the Open Software Foundation (OSF) for Unix computer platforms. It should be understood, however, that the present invention is not limited to the ANSI and OSF standards.

The present invention, in either its present form or in the forms now contemplated, is applicable to computing environments which use deviations, modifications, and extensions of the ANSI and OSF standards. The scope of the present invention with respect to the ANSI and OSF standards is more fully described in the following text.

Figure 1:
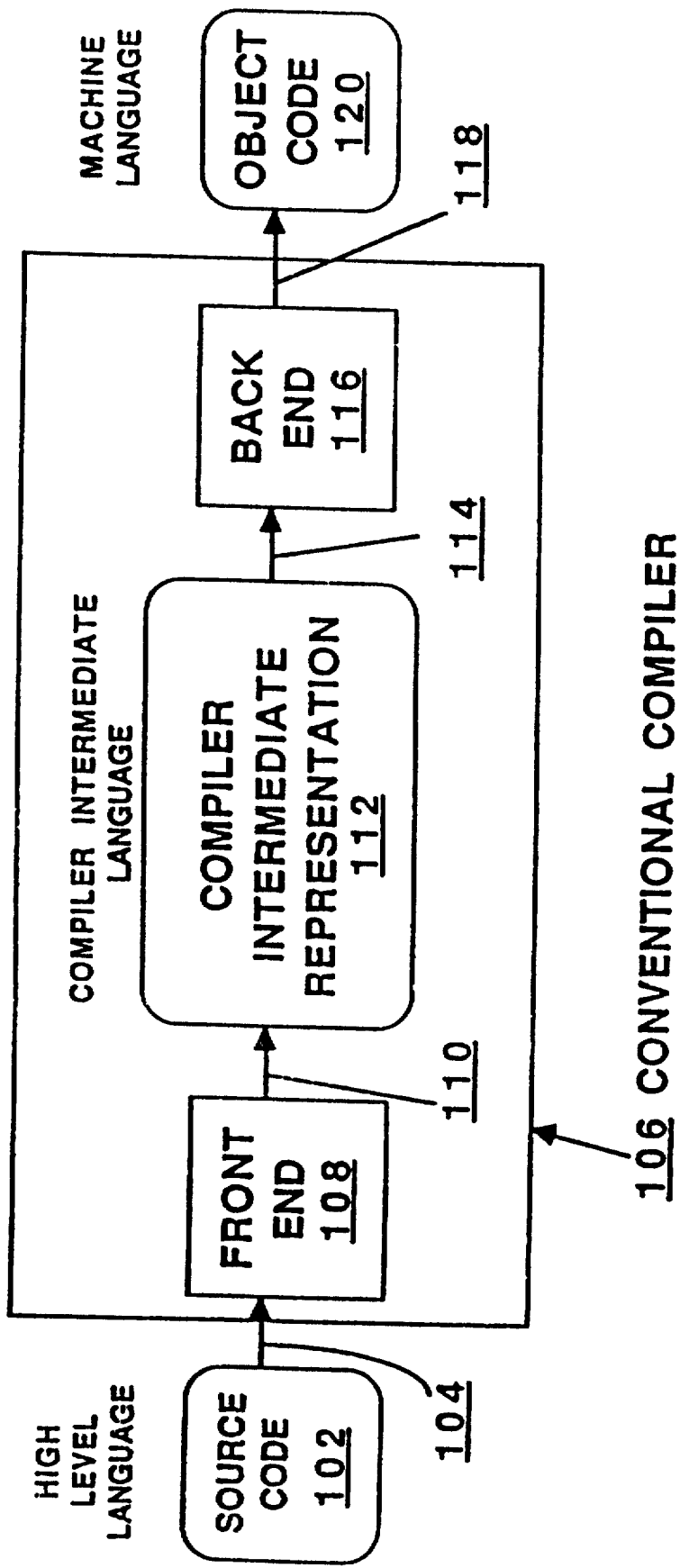
FIG. 1 is a high-level structural and operational block diagram of conventional computer software compilers. The square blocks represent modules and the arrows represented operation and data flow.

As shown in FIG. 1, a conventional compiler 106 is logically divided into two parts, a compiler front end 108 and a compiler back end 116. The compiler front end 108 receives as input a computer program source code 102 as input. The computer program 102 is ordinarily written in a high-level computer programming language such as Pascal, C, and Ada.

The compiler front end 108 is responsible for the language processing of computer programs, such as scanning, parsing, and semantic analysis. Following the completion of all language processing, the compiler front end 108 translates the computer program source code 102 into a compiler intermediate representation 112. The compiler intermediate representation 112 is written in a compiler intermediate language, such as Pcode and Ucode.

The compiler back end 116 receives as input the compiler intermediate representation 112 and generates object code 120 for a target computer platform (not shown). The target computer platform is the computer platform where the compiler back end 116 resides. The object code 120 is written in a particular machine language of the target computer platform.

Ordinarily, the compiler front end 108 operates in a machine dependent, or architecture dependent, manner. Thus, the compiler intermediate representation 112, which is generated by the compiler front end 108, is usually dependent upon the computer architecture of the native computer platform (i.e., the computer platform where the compiler front end 108 resides).

The present invention is a significant improvement from the conventional compiler 106 shown in FIG. 1. The improvement of the present invention is achieved by using a HPcode-Plus compiler intermediate language as the compiler intermediate language. The HPcode-Plus compiler intermediate language (or simply, HPcode-Plus) is an improvement upon conventional compiler intermediate languages, such as Pcode and Ucode, in that HPcode-Plus is architecture neutral. As such, compilers which are based on the HPcode-Plus compiler intermediate language operate in an architecture neutral, or machine independent, manner.

Figure 2:
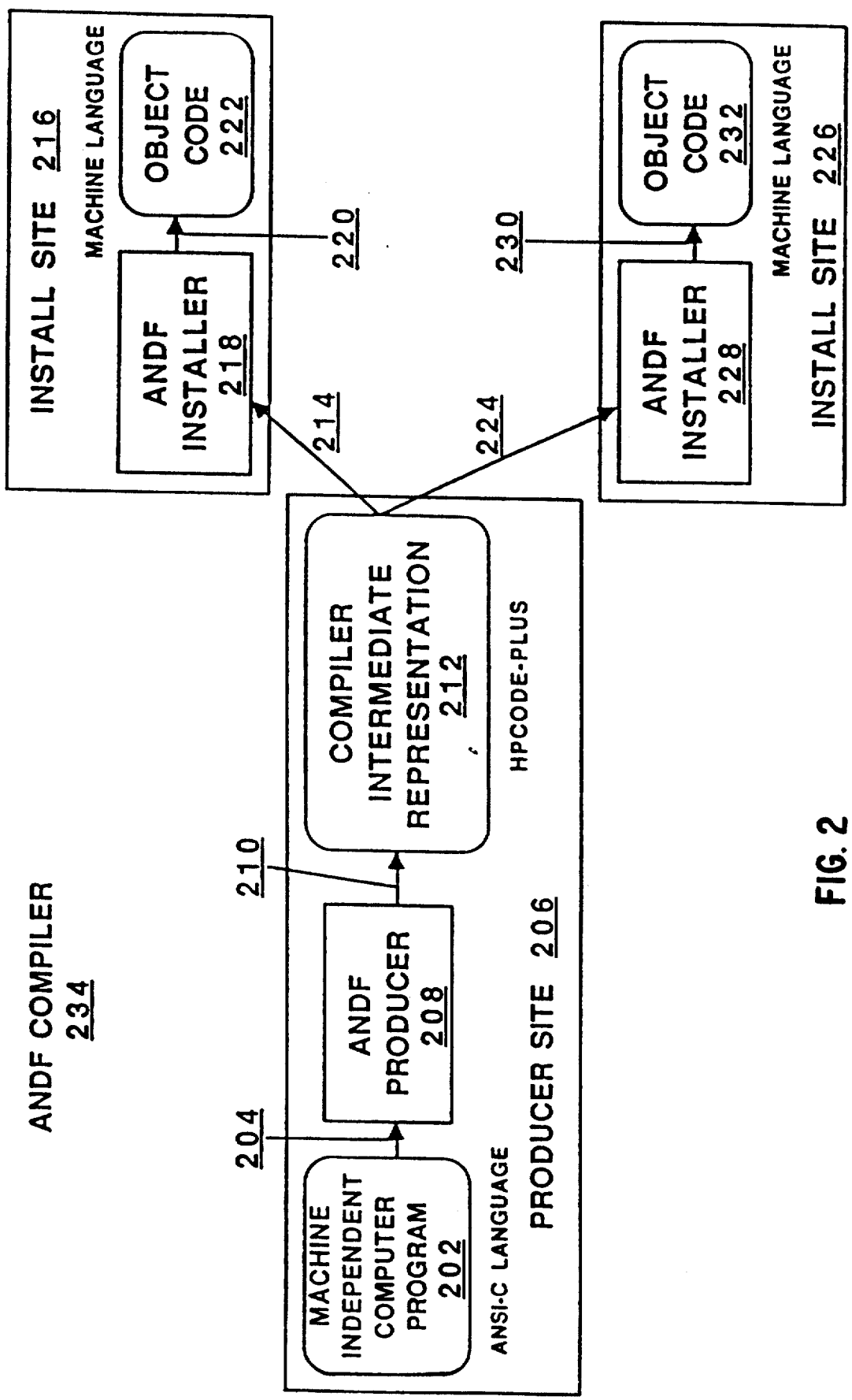
FIG. 2 is a high-level structural and operational block diagram of a preferred embodiment of the present invention. The square blocks represent modules and the arrows represented operation and data flow.

FIG. 2 presents an overview of a preferred embodiment of the present invention. Included in FIG. 2 is a high-level block diagram of an architecture neutral distribution format compiler 234 of the present invention (i.e., an ANDF compiler). The ANDF compiler 234 shown in FIG. 2 is based on the HPcode-Plus compiler intermediate language.

In the preferred embodiment of the present system, logic for the ANDF Compiler 234 is stored in a computer program. The computer program is stored in a computer readable medium, such as a magnetic tape, a magnetic disk, and a read only memory (ROM).

Like conventional compilers 106, the ANDF compiler 234 of the present invention has a front end. With the ANDF compiler 234, however, the front end is called an ANDF Producer 208. The ANDF compiler 234 also has one or more back ends. In the preferred embodiment of FIG. 2, two back ends, called ANDF Installers 218 and 228, are shown.

The ANDF Producer 208 resides on a native computer platform 206. It should be noted that the native computer platform 206 is also called a producer site. The one or more ANDF Installers 218 and 228 reside on install sites 216 and 226, respectively, which are also called target computer platforms. It should be noted that the producer site 206 and install sites 216, 226 may or may not represent the same computer platform.

The ANDF Producer 208 and the ANDF Installers 218, 228 can operate either independently, as two separate computer programs, or together, as two phases of a single computer program.

As shown in FIG. 2, the ANDF Producer 208 receives the ANSI-C source code of machine independent computer programs 202. It should be understood, however, that the present invention is not limited to support for only ANSI-C source language programs. As described below, support for other high-level languages is contemplated.

Machine independent computer programs 202 are computer programs which are composed of instructions. These instructions include high-level source statements and expressions.

Machine independent computer programs 202 do not make assumptions on system specific features, such as memory architectures and register architectures. Machine independent computer programs 202 also do not contain references to system specific functions, such as non-standard operating system function calls. Machine independent computer programs 202 may contain references to standard object-like macros, function-like macros, and data type definitions from standard header files. Machine independent computer programs 202 may also contain references to standardized function calls. The standard header files and standardized function calls are defined by a language standard, such as ANSI-C.

The ANDF Producer 208 operates in an architecture neutral, or machine independent, manner according to the HPcode-Plus compiler intermediate language. Thus, in translating the ANSI-C source language program 202 to a compiler intermediate representation 212, the ANDF Producer 208 makes no assumptions about the architecture of the target computer platforms 216 and 226. Thus, the compiler intermediate representation 212 generated by the ANDF Producer 208 is architecture neutral, or machine independent, and represents an architecture neutral distribution format (ANDF).

The compiler intermediate representation 212 is distributed to the target computer platforms 216 and 226. The ANDF Installers 218 and 228, which reside on the target computer platforms 216 and 226, respectively, translate the compiler intermediate representation 212 to object code representations 222 and 232.

In an alternative embodiment of the present invention, ANDF Installers 216, 226 are replaced by ANDF Interpreters (not shown in FIG. 2). The ANDF Interpreters directly execute the compiler intermediate representation 212 without first translating the compiler intermediate representation 212 to object code representations 222, 232.

As noted above, the HPcode-Plus compiler intermediate language is used as the compiler intermediate language in the preferred embodiment of the present invention. Thus, the ANDF Producer 208 writes the compiler intermediate representation 212 in the HPcode-Plus compiler intermediate language.

The HPcode-Plus compiler intermediate language is an improvement upon HPcode, which was an improvement upon U-Code. U-Code is a compiler intermediate language which was originally used for distributing a Pascal compiler to the CRAY-1 and S-1 computer platforms. It was developed by Stanford and the University of California at San Diego. U-Code, however, was not architecture neutral and could only support Pascal and Fortran source language programs.

HPcode is also a compiler intermediate language. It was based on U-Code, but its instruction set was expanded to support other high-level languages, including Pascal, Fortran, Ada, Cobol, RPG, Business Basic, an internal Algol-like language, and a fourth generation language called HP-Transact.

As noted above, the HPcode-Plus compiler intermediate language is an improvement upon HPcode, and upon all conventional compiler intermediate languages, in that HPcode-Plus is architecture neutral. As such, compilers which are based on the HPcode-Plus compiler intermediate language, such as the ANDF compiler 234 of the present invention, operate in an architecture neutral, or machine independent, manner.

The HPcode-Plus compiler intermediate language is a further improvement upon HPcode, in that HPcode-Plus supports the C programming language.

The following sections describe the present invention in more detail.

Section 2 describes the HPCode-Plus compiler intermediate language, which is the compiler intermediate language of the present invention.

Section 3 describes the ANDF Producer 208 of the present invention.

Section 4 describes the ANDF Installer 218, 228 of the present invention.

Some aspects of the present invention can be implemented using existing compiler technology. However, modifications upon existing compiler technology are required to achieve the improvements of the present invention. The discussions in Sections 2, 3, and 4 focus on these modifications upon existing compiler technology. For a general discussion of existing compiler technology, see *Compilers, Principles, Technigues, and Tools* by Alfred V. Aho, Ravi Sethi, and Jeffrey D. Ullman (Addison Wesley 1986), which is incorporated in its entirety herein by reference.

As it presently exists, the HPcode-Plus compiler intermediate language can be used as the compiler intermediate language for architecture neutral C compilers on OSF computer platforms, such as the ANDF compiler 234 of the present invention. Thus, the descriptions of the preferred embodiment of the present invention in Sections 2, 3, and 4 are, for the most part, focused on this computing environment.

It should be understood, however, that the present invention is not restricted to this computing environment.

Since it is an improvement of HPcode, the HPcode-Plus compiler intermediate language has a rich instruction set for supporting other high-level languages, such as Pascal, Fortran, Ada, Cobol, RPG, Business Basic, an internal Algol-like language, and a fourth generation language called HP-Transact. It is contemplated to modify HPcode-Plus to support these languages in an architecture neutral manner.

Additionally, the compiler intermediate representations 212 produced by ANDF compilers 234 should operate on any computer platform, provided that (1) the source language program 202 was written in a machine independent manner using standardized function calls to a run-time library, and (2) appropriate ANDF Installers 218, 228 exist on the target computer platforms 216, 226.

2. HPcode-Plus

In the preferred embodiment of the present invention, the HPcode-Plus compiler intermediate language is used as the compiler intermediate language.

HPcode-Plus is an improvement upon conventional compiler intermediate languages in that HPcode-Plus is architecture neutral. As such, compilers which are based on the HPcodePlus compiler intermediate language, such as the ANDF compiler 234 of the present invention, operate in a architecture neutral, or machine independent, manner.

Features of the HPcode-Plus compiler intermediate language are described in this section. HPcode-Plus instructions are shown with all letters capitalized.

Other features of HPcode-Plus are described as necessary in Sections 3 and 4 of this document. When reading these sections, it may be helpful to refer to FIGS. 3A through 3D, which present a list of the HPcode-Plus compiler intermediate language instructions for ANSI-C.

2.1 Virtual Machine Model (Expression Stack Model)

The HPcode-Plus compiler intermediate language is very similar to assembly language for a HPcode-Plus virtual (i.e., fictional) computer platform. Correspondingly, compiler intermediate representations written in the HPcode-Plus compiler intermediate language are very similar to assembly language programs for the HPcode-Plus virtual computer platform.

Referring to FIG. 2, for example, the ANDF Producer 208 translates the source code 202 into its equivalent assembly language representation 212.

The ANDF Producer 208, however, does not generate the assembly language representation 212 for its native computer platform 206. Rather, the ANDF Producer 208 generates the assembly language representation 212 for the HPcode-Plus virtual computer platform. The HPcode-Plus compiler intermediate language represents the assembly language for the HPcode-Plus virtual computer platform.

The ANDF Installer 218, 228 receives the compiler intermediate representation 212, which represents assembly language for the HPcode-Plus virtual computer platform, and generates the object code 222, 232 for its target computer platform 216, 226.

The HPcode-Plus virtual computer platform contains an expression stack and a memory. Most HPcode-Plus instructions receive their arguments from and push their results to the expression stack. A data type is associated with each data object on the expression stack.

HPcode-Plus instructions do not directly manipulate arbitrary expression stack elements. At most, HPcode-Plus instructions manipulate only the top N elements of the expression stack, where N is defined for each HPcode-Plus instruction.

HPcode-Plus instructions DUP, SWP, and ROT manipulate the top elements on the expression stack without altering their values. A HPcode-Plus instruction DEL deletes the top element on the expression stack.

Several HPcode-Plus instructions are provided for moving data between the expression stack and the memory, including HPcode-Plus instructions LOD and ILOD for direct and indirect load, HPcode-Plus instructions STR and ISTR for direct and indirect store, and HPcode-Plus instruction INST for indirect non-destructive store.

In addition, data object addresses, labels, and procedures are loaded on the expression stack with HPcode-Plus instructions LDA, LDL, and LDP, respectively. HPcode-Plus instructions LDC and LCA are used to load constants and constant addresses on the expression stack.

The expression stack may not physically exist on target computer platforms 216, 226. For example, if target computer platforms 216, 226 are register-based, then the expression stack may be modeled in registers.

Care must be taken by the ANDF Installers 218, 228 to preserve the semantics of the expression stack. Values loaded onto the expression stack are "copied" onto the expression stack. HPcode-Plus instructions do not alter values already on the expression stack.

Certain restrictions are enforced concerning the use of the expression stack. Branching and label HPcode-Plus instructions require the expression stack to be empty. This relieves the ANDF Installer 218, 228 from having to determine all possible jump sources for each label.

HPcode-Plus procedure calls may occur when the expression stack is empty. Elements which are on the expression stack when a HPcode-Plus instruction MST is executed will not be visible to the called procedure but will become visible again upon return.

2.2 Memory Model

HPcode-Plus defines a memory model in which the memory is divided into 4 areas: Static memory, Local memory, Constant memory, and Parameter memory. Data objects in each memory area can have 3 attributes associated with them: Constant attribute, Register attribute, and Volatile attribute.

In the architecture neutral environment of the present invention, the ANDF Producer 206 makes no assumptions concerning the manner in which data objects are mapped into the memories of target computer platforms 216, 226. A HPcode-Plus instruction SYM is provided to defer actual memory allocation to the ANDF Installers 218, 228.

The ANDF Producer 208 uses the HPcode-Plus instruction SYM to give a unique symbolic identifier to each data object and data type. The only exception to this rule is that the symbolic identifier of data types and data objects in local scopes can be reused.

The ANDF Producer 208 also uses the HPcode-Plus instruction SYM to associate a memory type and attribute (i.e., Constant, Register, and Volatile) with each data object.

HPcode-Plus memory reference instructions access memory through the symbolic identifiers of data objects defined by the SYM HPcode-Plus instruction. These HPcode-Plus memory reference instructions include LDA and LCA to load an address of an HPcode-Plus data object onto the expression stack. Also, HPcode-Plus contains instructions which manipulate memory indirectly, such as the string instructions.

The ANDF Installers 218, 228 map data objects into the memories of their target computer platforms 216, 226. Such mapping depends on the memory type and attribute associated with each data object. A description of the memory types and attributes is presented in the following paragraphs.

Data objects with the Static memory type maintain their values from one invocation of a procedure to the next. Static memory can be subdivided into global static memory, imported static memory, exported static memory, and procedure static memory. Variables mapping into these memories include file static variables, imported static variables, exported static variables, and procedure (or local) static variables, respectively.

Data objects with the Local memory type do not maintain their values from one invocation of a procedure to the next. These objects are allocated to the Local memory area. Each procedure receives one Local memory area.

For languages which do not support nested level procedures, such as ANSI-C, local data objects can only be referenced by the defining procedure.

For languages supdistributing nested level procedures, such as Pascal, local data objects can be referenced by the defining procedure or its lower level nested procedures. For these languages, the scoping rules are equivalent to those in Pascal.

Data objects with the Parameter memory type are allocated in the Parameter memory area. Each procedure receives one Parameter memory area.

For languages which do not support nested procedures, such as ANSI C, variables in the Parameter memory area may be referenced only by the defining procedure.

For languages which support nested procedures, such as Pascal, variables in the Parameter memory area may be referenced from outside the defining procedure subject to the Pascal scoping rules. This area is allocated by the calling procedure.

All HPcode-Plus constants reside in the Constant memory area. In addition, any data objects with the Constant memory attribute defined by the SYM HPcode-Plus instruction of KIND_MODIFIER are allocated in the Constant memory area.

The ANDF Installers 218, 228, if possible, treat the Constant memory area as read-only. The ANDF Producer 208, however, does not assume that the target computer platforms 216, 226 can support read-only memory. Assignment to the Constant memory area yields undefined behavior.

The Register attribute serves as a hint to the ANDF Installers 218, 228 that the associated data object should be allocated in fast cache memory. The ANDF Installers 218, 228, however, are not obliged to honor the request. Loading an address of a variable with the register attribute set can automatically turn off the register attribute.

2.3 Memory Allocation and Data Types

The ANDF Producer 208 makes no assumptions concerning the manner in which data objects are mapped into the memories of target computer platforms 216, 226. Instead, the ANDF Producer 208 satisfies memory requests through the SYM HPcode-Plus instruction.

Actual memory allocation is performed by the ANDF Installers 218, 228. The actual size and alignment of each data object is determined by ANDF Installers 218, 228, based on the data type specified in the SYM HPcode-Plus instruction.

HPcode-Plus defines predefined data types. A list of the HPcode-Plus predefined data types is presented in FIG. 5. With minor differences, the HPcode-Plus predefined data types map into the corresponding data types in ANSI-C. The mapping of ANSI-C data types to HPcode-Plus predefined data types is presented in FIG. 6.

The HPcode-Plus predefined data types have unique predefined symbolic identifiers. The HPcode-Plus predefined data types are the only data types that need not be defined by the SYM HPcode-Plus instruction. They are the building blocks for user-defined data types.

The user-defined data types, which represent all data types besides the HPcode-Plus predefined data types, are defined using the SYM HPcode-Plus instruction with the <sym kind> parameter equal to one of the type values listed in FIG. 7.

The ANDF Installers 218, 228 must ensure that their memory allocation schemes are consistent with those of a compiler on the native computer platform 206.

2.4 HPcode-Plus Object File

Figure 11:
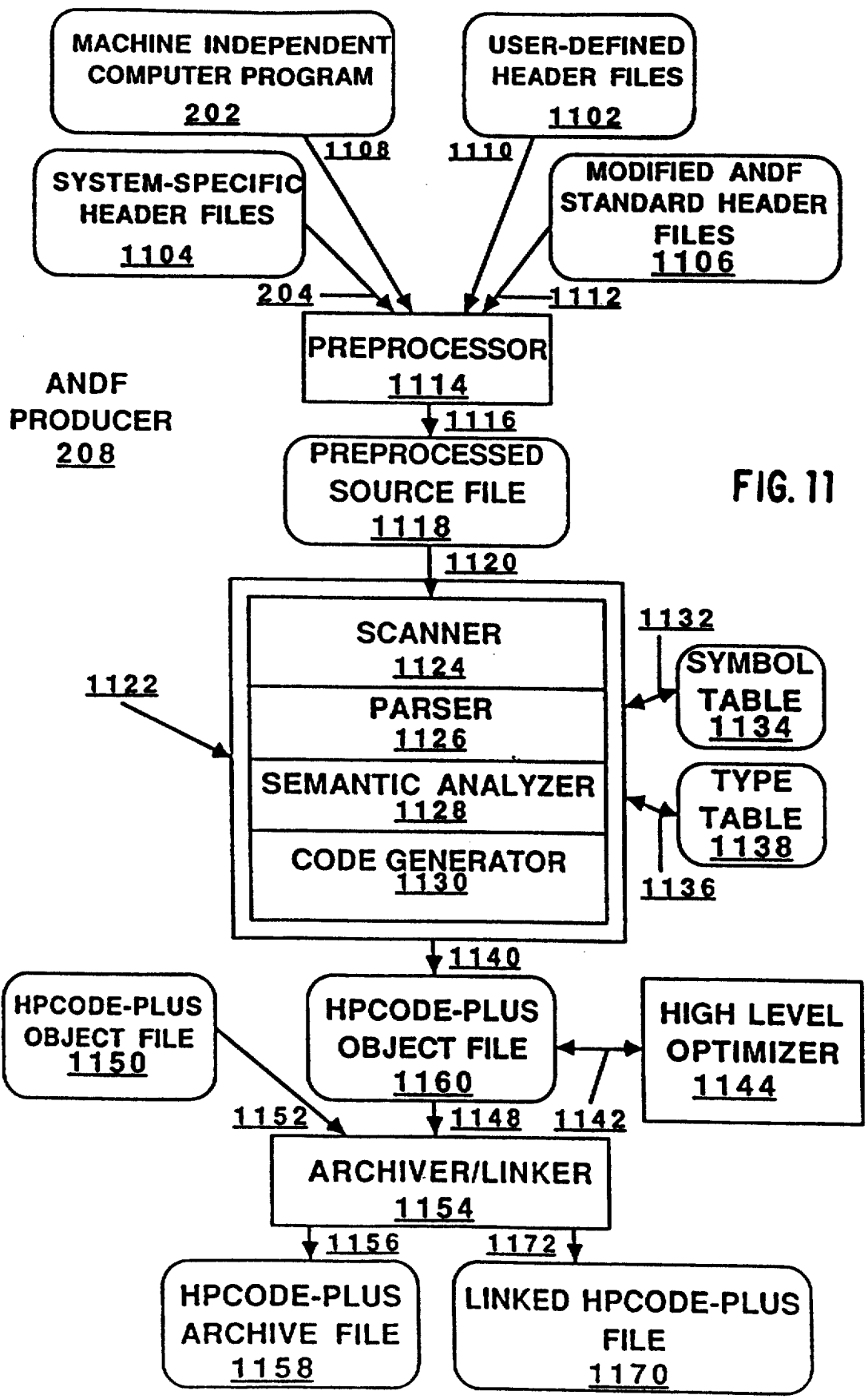
FIG. 11 is a structural and operational block diagram of a preferred embodiment of the ANDF Producer. The square blocks represent modules and the arrows represented operation and data flow.

The compiler intermediate representation 212 produced by the ANDF Producer 208 is stored in a HPcode-Plus Object file 1160 (FIG. 11).

The HPcode-Plus Object file 1160 is a file containing a sequence of HPcode-Plus instructions in ASCII form which follow certain rules of form. The HPcode-Plus Object file 1160 is also referred to as a compilation unit.

As shown in FIG. 11, several HPcode-Plus Object files 1150, 1160 can be achived or linked by an Archiver/Linker 1154 to produce a single HPcode-Plus Archive file 1158 or Linked HPcode-Plus File 1170.

The format of the HPcode-Plus Object file 1150, 1160 is shown in FIG. 8.

HPcode-Plus instruction names are shown in FIG. 8 in text form for readability only. In actual HPcode-Plus Object files 1150, 1160, numeric opcodes are used instead.

Instructions are delimited by ASCII new line characters. All integers, including opcodes, are represented by hexadecimal literals to minimize the size of the HPcode-Plus Object file 1150, 1160.

Within a line, fields are delimited by one or more blanks. An 'opcode' field is first, followed by zero or more 'operand' fields. Operand fields consist of integers, quoted strings, labels, real numbers, digit strings representing sets and '%' or '#' followed by integers representing macro arguments and SYM symbolic ids, respectively. Quoted strings are delimited by double quotes (an internal quote is represented by two double quotes in a row).

Each ENT/END HPcode-Plus instruction sequence denotes the code of a procedure. SYM HPcode-Plus instructions within a pair of KIND_FUNCTION and KIND_END SYM HPcode-Plus instructions represent the data declarations of that procedure.

For languages which allow multiple entry points, more than one ENT HPcode-Plus instruction appears before the END HPcode-Plus instruction. The first ENT HPcode-Plus instruction signals the primary entry point and defines the start of the scope of a procedure. The END HPcode-Plus instruction signals the end of the entire procedure.

If the HPcode-Plus Object file 1150, 1160 contains the procedure which serves as the program entry point. Then the HPcode-Plus Object file 1150, 1160 is specially marked with an OPTN HPcode-Plus instruction. Execution of an HPcode-Plus computer program begins with the program entry point procedure. Each HPcode-Plus instruction is executed in sequence unless an error occurs or a HPcode-Plus instruction is executed which transfers control.

If the source computer program 202 contains nested procedures (Pascal, Cobol or Ada), the outer level procedure and all its inner procedure must appear in the same HPcodePlus Object file 1150, 1160.

2.5 HPcode-Plus Instruction Set for ANSI-C

As it presently exists, HPcode-Plus can be used as the compiler intermediate language for architecturally neutral C compilers on OSF computer platforms. It should be understood, however, that the present invention is not restricted to this computing environment.

As described above, HPcode-Plus has a rich instruction set for supdistributing high-level languages other than C, such as Pascal, Fortran, Ada, Cobol, RPG, Business Basic, an internal Algol-like language, and a fourth generation language called HP-Transact. It is contemplated to modify HPcode-Plus to support these languages in an architecture neutral manner.

Additionally, the compiler intermediate representations produced by ANDF compilers 234 should operate on any computer platform, provided that (1) the source computer program 202 was written in a machine independent manner using standardized function calls to the run-time library, and (2) appropriate ANDF Installers 218, 228 exist on the target computer platforms 216, 226.

The HPcode-Plus instruction set for ANSI-C is presented in FIGS. 3A through 3D. These code-Plus instructions are described in the following sections. In these sections, expression stack elements and mandatory passed parameters are denoted by "< >". Optional passed parameters are denoted by "[]". The abbreviation "op" represents "operand".

In its present form, HPcode-Plus does not support parallelism and vectorization. Currently, all HPcode-Plus instructions operate on scalar items. However, HPcode-Plus is capable of carrying sufficient information to support vector operations. Thus, HPcode-Plus can easily be enhanced to support both parallelism and vectorization.

Existing HPcode-Plus instructions which are required to support other high-level languages, but which are not yet completely architecture neutral, are presented in FIG. 4.

2.5.1. ACVT—Arithmetic ConVerT

The syntax of HPcode-Plus instruction ACVT is presented below:

ACVT

ACVT is used to convert operands to a known data type. ACVT pops <op2> and <op1> from the expression stack. ACVT performs data type conversions on <op2> and <op1> to prepare <op2> and <op1> for arithmetic processing. After conversion, <op2> and <op1> are pushed onto the expression stack.

Conversion rules are language specific. HPcode-Plus instruction LANGUAGE OPTN indicates which set of rules to use. For example, the usual arithmetic conversions for ANSI-C are:

- If either operand has type long double, the other operand is converted to long double.
- Otherwise, if either operand has type double, the other operand is converted to double.
- Otherwise, if either operand has type float, the other operand is converted to float.
- Otherwise, if one operand has type long int and the other has type unsigned int, then if a long int can represent all values of an unsigned int, then the operand of type unsigned int is covered to long int; if a long int cannot represent all the values of an unsigned int, both operands are converted to unsigned long int.
- Otherwise, if either operand has type long int, the other operand is converted to long int.
- Otherwise, if either operand has type unsigned int, the other operand is converted to unsigned int.
- Otherwise, both operands are converted to type int.

The ANDF Installers 218, 228 use a general conversion table to implement the conversion rules. This conversion table is implemented as a two dimension conversion table as follows:

|              | TYPE_CHAR | TYPE_UNS_CHAR | .. |
|--------------|-----------|---------------|----|
| TYPE_CHAR    | TYPE_INT  | TYPE_INT      | .. |
| TYPE_UNS_CHAR| TYPE_INT  | TYPE_INT      | .. |
| ..           | ..        | ..            | .. |

Each language has a unique conversion table which resides on each target computer platform 216, 226.

2.5.2. ADD—ADD

The syntax of HPcode-Plus instruction ADD is presented below:

ADD

ADD pops <op1> and <op2> from the expression stack. The addition <op1> + <op2> is performed to produce a result. The result, having the same data type as <op1> and <op2>, is then pushed on the expression stack.

2.5.3 AND—logical AND

The syntax of HPcode-Plus instruction AND is presented below:

AND

AND pops <op1> and <op2> from the expression stack. A logical AND operation, <op1> AND <op2>, is performed to produce a result. The result, having the same data type as <op1> and <op2>, is then pushed on the expression stack.

A bitwise AND is performed when <op1> and <op2> are integers or characters. That is, corresponding bits in <op1> and <op2> are ANDed to produce <result>.

2.5.4. CEND—Conditional evaluate END

The syntax of HPcode-Plus instruction CEND is presented below:

CEND

This HPcode-Plus instruction marks the end of a conditionally evaluated instruction sequence begun by a matching HPcode-Plus instruction CEXP.

The CEND HPcode-Plus instruction does not manipulate the expression stack. The item that is on top of the expression stack is the result produced by the matching CEXP instruction. The type of the item on top of the stack must be the same as the data type of the two CEXP clauses.

The CEND HPcode-Plus instruction can only be used to terminate the most recent CEXP HPcode-Plus instruction. It is an error if there is no preceding conditional instruction.

2.5.5. CEVL—Conditional EVaLuate

The syntax of HPcode-Plus instruction CEVL is presented below:

CEVL

This HPcode-Plus instruction leaves the expression stack unchanged. CEVL acts as a delimiter between two parts of a conditional expression. For example, two CEVLs are required with each CEXP instruction. One CEVL separates <boolean value> from <true expression>, and the other separates <false expression> from <true expression>.

Stack items on the expression stack at the time of CEVL are not accessed until the conditional expression is terminated with a CEXP instruction.

2.5.6. CEXP—Conditionally evaluate EXPression

The syntax of HPcode-Plus instruction CEXP is presented below:

CEXP

This HPcode-Plus instruction pops a boolean operand <boolean op> off the top of the expression stack. If <boolean op> is FALSE, then control is passed to a matching CSEP instruction. An item that is on top of the expression stack when a matching CEND instruction is encountered is treated as a result of the CEXP instruction.

If the item popped off the top of the expression stack is TRUE, then HPcode-Plus instructions up to the matching CSEP are evaluated. Control is then passed to the matching CEND HPcode-Plus instruction. The item that is on top of the stack when the matching CSEP instruction is encountered is treated as the result of the CEXP HPcode-Plus instruction.

The HPcode-Plus instructions between the CEXP and the matching CSEP HPcode-Plus instructions represent the true clause of the conditional evaluation. The HPcode-Plus instructions between the CSEP and the matching CEND HPcode-Plus instructions represent the false clause of the conditional evaluation.

Both the true clause and the false clause must either result in zero or one item being pushed onto the expression stack. The data type of the resulting item pushed on to the expression stack by either clause must match and corresponds to the data type of the result of the CEXP HPcode-Plus instruction.

It is possible for the true and false clauses to not leave any result on the stack. In particular, this happens with the ANSI-C conditional expression operator if the true and false clauses are of type void. There is no <result> pushed to the expression stack in this case.

It is an error to specify the CEXP HPcode-Plus instruction without specifying matching CSEP and CEND HPcode-Plus instructions. It is also an error for either the true clause or the false clause to reference items pushed on the expression stack outside the respective clauses.

2.5.7. CLDC—C LoaD Constant

The syntax of HPcode-Plus instruction CLDC is presented below:

CLDC <flag> <constant value>

CLDC converts <constant value> to a data type indicated by <flag> to produce a result. CLDC then pushes the result onto the expression stack.

The values and corresponding data types of <flag> are presented below.

| <flag> | Data Types |
|--------|------------|
| 0      | TYPE_INT, TYPE_LONGINT, TYPE_UNS_LONGINT |
| 1      | TYPE_INT, TYPE_UNS_INT, TYPE_LONGINT, TYPE_UNS_LONGINT |
| 2      | TYPE_UNS_INT, TYPE_UNS_LONGINT |
| 3      | TYPE_LONGINT, TYPE_UNS_LONGINT |

-continued

| <flag> | Data Types |
|---|---|
| 4 | TYPE_UNS_LONGINT |

If <flag> is 0, then the ANDF Installer 218, 228 converts <constant value> to TYPE_INT, if possible. If it is not possible, then the ANDF Installer 218, 228 converts <constant value> to TYPE_LONGINT, if possible. If it is not possible, then the ANDF Installer 218, 228 converts <constant value> to TYPE_UNS_LONGINT.

The ANDF Producer 208 does not know what the ultimate data type of <constant value> will be. Thus, the ANDF Producer 208 cannot use CLDC prior to arithmetic operations. For arithmetic operations, ANDF Producers must use the ACVT HPcode-Plus instruction.

2.5.8. COMM—COMMent Syntax

The syntax of HPcode-Plus instruction COMM is presented below:

COMM <comment>

COMM is used to place comments within the HPcode-Plus Object file 1150, 1160. COMM HPcode-Plus instructions can appear anywhere in the HPcode-Plus Object file 1150, 1160.

2.5.9. CSEP—Conditional evaluation SEParator

The syntax of HPcode-Plus instruction CSEP is presented below:

CSEP

CSEP leaves the stack unchanged. CSEP is used in conjunction with CEXP HPcode-Plus instructions. CSEP HPcode-Plus instructions simply act as delimiters between true clauses and false clauses of matching CEXP HPcode-Plus instructions.

An error is generated if CSEP HPcode-Plus instructions are not accompanied by CEXP HPcode-Plus instructions.

2.5.10. CSJP—CaSe JumP

The syntax of HPcode-Plus instruction CSJP is presented below:

CSJP <else label>

CSJP pops <selector> from the expression stack.

CSJP uses <selector> to jump to either a location specified by HPcode-Plus instruction CTAB or <else label>.

CSJP must be immediately followed by one or more consecutive CTAB HPcode-Plus instructions, each of which specifies a label and a range of values. No pair of ranges may overlap.

CSJP branches to the label specified by the CTAB HPcode-Plus instruction whose range includes <selector>. If none of the CTAB ranges include <selector>, then CSJP branches to <else label>. <selector> must be the only item on the expression stack when CSJP is executed.

2.5.11. CTAB—Case TABle

The syntax of HPcode-Plus instruction CTAB is presented below:

CTAB <case label>[#]<low bound>[#]<high bound>

CTAB specifies an entry in a case jump table. CTAB must immediately follow either HPcode-Plus instruction CSJP or another CTAB HPcode-Plus instruction.

Different CTABs are allowed to have the same <case label>.

<Low bound> is an integer or a character specifying the lower bound of the range which selects <case label>. If [#] is passed, <low bound> must be an integer symbolic identifier of an integer or character constant.

<High bound> is an integer or a character specifying the upper bound of the range which selects <case label>. <Low bound> has to be less than or equal to <high bound>. If [#] if passed, <high bound> must be an integer symbolic identifier of an integer or character constant.

2.5.12. CUP—Call User Procedure

The syntax of HPcode-Plus instruction CUP is presented below:

CUP <proc symid>

CUP is used to call a procedure or function. <Proc symid>, which represents the symbolic id of the procedure or function, must be previously defined by the KIND_FUNC_DCL or KIND_FUNCTION SYM HPcode-Plus instruction.

CUP initiates the procedure or function call using parameters in the procedure's or function's parameter area. These parameters were placed in the procedure's or function's parameter area by previous PAR HPcode-Plus instructions.

For function calls (i.e., when the type of the procedure is not TYPE_VOID), CUP reserves an area in memory for a return value. The return value is actually placed in this memory area by HPcode-Plus instruction STFN.

2.5.13. CVT—ConVerT

The syntax of HPcode-Plus instruction CVT is presented below:

CVT <result type>

CVT pops <value> from the expression stack. CVT converts <value> to the data type indicated by <result type>. The converted <value> is pushed on the expression stack.

The following conversions are allowed:

| | | |
|---|---|---|
| boolean | => | integer and character |
| character | => | boolean, integer, pointer to a data object, or other char types |
| integer | => | boolean, character, floating point, pointer, or other integer types |
| floating point | => | character, integer, or other floating point types |
| pointer to a type of data object | => | character, integer, or pointer to any other type of data object |
| pointer to a function of one type | => | pointer to a function of another type |

2.5.14. DEL—DELete

The syntax of HPcode-Plus instruction DEL is presented below:

DEL

DEL deletes the item on top of the expression stack.

2.5.15. DIV—Divide

The syntax of HPcode-Plus instruction DIV is presented below:

DIV

DIV pops <left op> and <right op> from the expression stack. A division <left op>/21 right op> is performed to produce a result. The result is always a whole number. For example, 5/2 equals 2 (and −5/2 equals −2).

The result, having the same data type as <left op> and <right op>, is pushed on the expression stack.

2.5.16. DUP—Duplicate

The syntax of HPcode-Plus instruction DUP is presented below:
DUP

DUP pops <value> from the expression stack. DUP then pushes <value> back on the expression stack twice.

2.5.17. END—END of procedure

The syntax of HPcode-Plus instruction END is presented below:
END <proc symid>

END signals the end of a procedure. Thus, END must be the last HPcode-Plus instruction in the procedure. <Proc symid> must match the procedure's symbolic identifier. END HPcode-Plus instructions are paired with ENT HPcode-Plus instructions. The expression stack must be empty when END is executed. END behaves like a RET HPcode-Plus instruction.

2.5.18. ENT—procedure ENTry

The syntax of HPcode-Plus instruction ENT is presented below:
ENT <proc symid>

ENT identifies a procedure entry point. The procedure must begin with the ENT HPcode-Plus instruction to identify the main entry point of the procedure.

Other ENT HPcode-Plus instructions may be placed in the procedure's body to identify alternate entry points (used by some programming languages such as FORTRAN). If alternate entry points are specified, the flow of control through the procedure must be such that only one ENT HPcode-Plus instruction is actually executed. This may be accomplished by preceding each ENT HPcode-Plus instruction which specifies an alternate entry point with either the RET HPcode-Plus instruction or a branch instruction.

There has to be a matching END HPcode-Plus instruction for each main entry ENT HPcode-Plus instruction.

2.5.19. EQU—EQUals

The syntax of HPcode-Plus instruction EQU is presented below:
EQU

EQU pops <right op> and <left op> from the expression stack. If <right op> and <left op> are equal, then the boolean value TRUE is pushed on the expression stack. Otherwise, the boolean value FALSE is pushed on the expression stack.

2.5.20. FJP—False JumP

The syntax of HPcode-Plus instruction FJP is presented below:
FJP <label>

FJP pops boolean value <condition> from the expression stack. <Condition> must be the only item on the expression stack when FJP is executed.

FJP jumps to <label> if <condition> is FALSE. <Label> must occur in a LAB HPcode-Plus instruction in the current procedure.

2.5.21. GEQ Greater than or EQual

The syntax of HPcode-Plus instruction GEQ is presented below:
GEQ

GEQ pops <left op> and <right op> from the expression stack. If <left op> is greater than or equal to <right op>, then the boolean value TRUE is pushed on the expression stack. Otherwise, the boolean value FALSE is pushed onto the expression stack. For boolean data types, TRUE is greater than FALSE.

2.5.22. GRT—GReaTer than

The syntax of HPcode-Plus instruction GRT is presented below:
GRT

GRT pops <right op> and then <left op> from the expression stack. If <left op> is greater than <right op>, the boolean value TRUE is pushed on the expression stack. Otherwise, FALSE is pushed on the expression stack.

2.5.23. ICUP—Indirect Call User Procedure

The syntax of HPcode-Plus instruction ICUP is presented below:
ICUP

ICUP pops <function ptr> from the expression stack. ICUP then calls a procedure which is pointed to by <function ptr>. The called procedure uses procedure variables which were previously initialized statically or by LDP HPcode-Plus instructions. ICUP is commonly used to support procedures as parameters in Pascal.

If ICUP is calling a function (i.e., if the procedure's data type is not TYPE_VOID), then a return value will be pushed onto the expression stack after the call.

2.5.24. ICVT—Integral ConVerT

The syntax of HPcode-Plus instruction ICVT is presented below:
ICVT

ICVT pops <value> from the expression stack. ICVT performs an integral promotion of <value> as defined by ANSI-C to produce a result. ICVT then pushes the result onto the expression stack.

ICVT accepts only unsigned integral types. For signed varieties, CVT should be used.

Since the ANDF Producer 208 cannot determine the result's data type, the result cannot be used immediately for an arithmetic operation which requires operands to be of the same type. The ACVT HPcode-Plus instruction should be used if an arithmetic operation is to be performed.

2.5.25. ILOD—Indirect LOaD

The syntax of HPcode-Plus instruction ILOD is presented below:
ILOD

ILOD pops <address> from the expression stack. <Address> represents an address of a data object. The data object referenced by <address> is retrieved and then pushed onto the expression stack.

If <address> references a structure or array, then the structure or array is pushed onto the expression stack with the ILOD HPcode-Plus instruction.

2.5.26. INC—INCrement

The syntax of HPcode-Plus instruction INC is presented INC <offset>

INC pops <value> from the expression stack, and increments <value> by <offset> to produce a result. if <value> is an address, <offset> is scaled to the size of the data object pointed to by <value>. The result is pushed onto the expression stack.

2.5.27. INIT—INITialize static data area

The syntax of HPcode-Plus instruction INIT is presented below:
INIT <target id> <source id>

INIT is used to initialize static, global, and constant data areas. A source, represented by <source id>, is compatible with a target, represented by <target id>, if
- <source id> and <target id> are of the same data type,
- <source id> and <target id> are both simple types and <source id> can be converted to <target id> using a CVT HPcode-Plus instruction. In such cases, the ANDF Installers 218, 228 perform implicit CVT instructions, or
- <source id> and <target id> are array types and the types of the array elements are the same but the dimension size of the source is smaller than that of the target. In such cases, the ANDF Installers 218, 228 perform partial initialization.

2.5.28. INST—Indirect Non-destructive STore

The syntax of HPcode-Plus instruction INST is presented below:
INST

INST pops <item> and then <address> from the expression stack. INST then stores <item> into <address>. INST also pushes <item> back onto the expression stack.

2.5.29. IOR—Inclusive OR

The syntax of HPcode-Plus instruction IOR is presented IOR

IOR pops <op1> and <op2> from the expression stack. A logical OR operation, <op1> OR <op2>, is performed to produce a result. The result, having the same data type as <op1> and <op2>, is then pushed on the expression stack.

For integer and character data types, a bitwise OR is performed. That is, corresponding bits in <op1> and <op2> are ORed.

2.5.30. ISTR—Indirect STORe

The syntax of HPcode-Plus instruction ISTR is presented ISTR

ISTR pops <item> and then <address> from the expression stack. ISTR then stores <item> into <address>.

2.5.31. IXE—IndeX an Element

The syntax of HPcode-Plus instruction IXE is presented below:
IXE <data type>

IXE pops <index item> and <base address> from the expression stack. The value of <index item> is multiplied by the size of the data type specified by <data type>. The product of this multiplication is added to <base address> to produce a result. The result, representing an index address, is then pushed onto the expression stack.

2.5.32. IXF—IndeX a Field

The syntax of HPcode-Plus instruction IXF is presented below:
IXF <fieldtype>

IXF pops <base address> from the expression stack. <Base address> represents the address of a structure. <Fieldtype> represents the symbolic id of a field within the structure.

IXF determines the offset from the beginning of the structure (specified by <base address>) to the field (specified by <fieldtype>) IXF adds the offset to <base address> and then pushes the sum of this addition to the expression stack.

<fieldtype> can be a field of a structure type in the case of nested structures.

2.5.33. LAB—LABel

The syntax of HPcode-Plus instruction LAB is presented below:
LAB <label> <flag>

LAB defines the location of <label> in a sequence of HPcode-Plus instructions. Executing LAB has no effect on the expression stack, although the expression stack must be empty when it is executed.

<Label> consists of one or more digits or alphabetic characters or '$'. All labels must be unique within a compilation unit. External labels must start with a letter. The values of <flag> and their associated conditions are:

| Value | Condition |
|---|---|
| 0 | A local label that cannot be referenced by a GOOB HPcode-Plus instruction. |
| 1 | An external label that can be referenced by a GOOB HPcode-Plus instruction. |

Note that GOOB is not used by ANSI-C. GOOB is used for Pascal to branch to a non-local label.

2.5.34. LDA—LoaD Address

The syntax of HPcode-Plus instruction LDA is presented below:
LDA <symid>

LDA pushes the address specified by <symid> to the expression stack. <Symid> is the symbolic id of a variable (defined by a KIND_SVAR, KIND FPARAM, or KIND_DVAR SYM HPcode-Plus instruction) or a constant (defined by a KIND_CONST SYM HPcode-Plus instruction or another constant defining SYM HPcode-Plus instruction).

2.5.35. LDC—LoaD Constant

The syntax of HPcode-Plus instruction LDC is presented below:
LDC <type symid> <value>

LDC pushes a simple constant to the expression stack (HPcode-Plus instruction LOD is used to push an aggregate constant to the expression stack).

<Type symid> and <value> specify the data type and the value, respectively, of the constant. <Value> must be within the range associated with <type symid>.

The external format of <value> is dependent upon the value of <type symid>:

| | |
|---|---|
| TYPE_BOOLEAN | Either an integer 0 or an integer 1, representing FALSE or TRUE, respectively. |
| TYPE_CHAR | An ASCII character in double quotes, with a double quote being represented by """". An integer is also allowed. The integer will be converted implicitly to a character by the ANDF Installer 218, 228. |
| TYPE_UNS_CHAR | An ASCII character in double quotes, with a double quote being represented by """". An unsigned integer is also allowed. The integer will be converted implicitly to a character by the ANDF Installer 218, 228. |
| TYPE_SINT | An integer. An ASCII characer in double quotes is also allowed. The ASCII character will be converted implicitly to an integer by the ANDF Installer 218, 228. |
| TYPE_INT | An integer. An ASCII characer in double quotes is also allowed. The ASCII character will be converted implicitly to an integer by the ANDF Installer 218, 228. |
| TYPE_LONGINT | An integer. An ASCII characer in double quotes is also allowed. The ASCII character will be converted implicitly to an integer by the ANDF Installer 218, 228. |
| TYPE_UNS_SINT | A positive integer. An ASCII characer in double quotes is also allowed. The ASCII character will be converted implicitly to a positive integer by the ANDF Installer 218, 228. |
| TYPE_UNS_INT | A positive integer. An ASCII characer in double quotes is also allowed. The ASCII character will be converted implicitly to a positive integer by the ANDF Installer 218, 228. |
| TYPE_UNS_LONGINT | A positive integer. An ASCII characer in double quotes is also allowed. The ASCII character will be converted implicitly to a positive integer by the ANDF Installer 218, 228. |

2.5.36. LDP—LoaD Procedure entry

The syntax of HPcode-Plus instruction LOP is presented below:
LDP <proc>

LDP pushes <proc>, the symbolic id of a procedure, onto the expression stack. LDP is typically used to pass procedures as parameters, or to assign procedures to procedure variables.

2.5.37. LEQ—Less than or EQual

The syntax of HPcode-Plus instruction LEQ is presented below:
LEQ

LEQ pops <right op> and <left op> from the expression stack. If <left op> is less than <right op>, then the boolean value TRUE is pushed onto the expression stack. Otherwise, the boolean value FALSE is pushed onto the expression stack.

2.5.38. LES—LESs Than

The syntax of HPcode-Plus instruction LES is presented below:
LES

LES pops <right op> and <left op> from the expression stack. If <left op> is less than <right op>, the boolean value TRUE is pushed onto the expression stack. Otherwise, the boolean value FALSE is pushed onto the expression stack.

2.5.39. LOC—LOCation

The syntax of HPcode-Plus instruction LOC is presented below:
LOC

LOC is used for debugging purposes. The ANDF Producer 208 generates LOC HPcode-Plus instructions when SYMBOLIC DEBUG OPTN HPcode-Plus instructions are encountered.

LOC is used to correlate a source language statement number (i.e., the offset) with a current location counter. LOC must precede HPcode-Plus instructions associated with source language statements.

2.5.40. LOD—LOAD

The syntax of HPcode-Plus instruction LOD is presented below:
LOD <item>

LOD pushes <item> onto the expression stack. <Item> can be a simple variable, a constant, or an aggregate variable such as an array or a structure.

2.5.41. MCAL—Macro CALl

The syntax of HPcode-Plus instruction MCAL is presented below:
MCAL <macro> <parm list>

MCAL invokes <macro>. <Macro> represents the symbolic id of a valid macro definition. <Macro> must be previously defined in a KIND_MACRO SYM instruction.

<Parm list> represents the actual parameters to <macro>. The number of parameters in <parm list> must match the definition for <macro>.

2.5.42. MPY—MultiPlY

The syntax of HPcode-Plus instruction MPY is presented below:

MPY

MPY pops <op1> and <op2> from the expression stack. A multiplication <op1>*<op2> is performed to produce a result. The result, having the same data type as <op1> and <op2>, is then pushed onto the expression stack.

2.5.43. MST—Mark STack

The syntax of HPcode-Plus instruction MST is presented below:

MST

MST is used to mark the expression stack in preparation for a procedure call. After marking the expression stack with MST, actual parameters for the procedure can be pushed onto the expression stack with PAR HPcode-Plus instructions.

The expression stack need not be empty before executing MST.

2.5.44. NEG—NEGate

The syntax of HPcode-Plus instruction NEG is presented below:

NEG

NEG pops <value> from the expression stack. NEG then negates <value> to produce a result. The result is pushed onto the expression stack.

<Value> must be a signed integer or a floating point. The result has the same type as <value>.

2.5.45. NEO—Not EQUals

The syntax of HPcode-Plus instruction NEQ is presented below:

NEQ

NEQ pops <right op> and <left op> from the expression stack. If <right op> and <left op> are not equal, the boolean value TRUE is pushed onto the expression stack. Otherwise, the boolean value FALSE is pushed onto the expression stack.

<Right op> and <left op> must be the same data type.

2.5.46. NOP—No Op

The syntax of HPcode-Plus instruction NOP is presented below:

NOP <argument list>

NOP represents a non-operation.

The ANDF Installers 218, 228 ignore NOP instructions. Parameters in <argument list> are passed to the next HPcode-Plus instruction.

2.5.47. NOT—NOT

The syntax of HPcode-Plus instruction NOT is presented below:

NOT

NOT pops <value> from the expression stack. NOT then performs a logical NOT operation on <value> to produce a result. The result is then pushed back onto the expression stack.

For integer and character types, each bit of <value> is NOT'ed. For boolean types, the values TRUE and FALSE are NOT'ed.

2.5.48. OPTN—Option

The syntax of HPcode-Plus instruction OPTN is presented below:

OPTN <option number> <parameter list>

OPTN is used to transmit option information from the ANDF Producer 208 to the ANDF Installers 218, 228. In general, the option information causes the ANDF Installers 218, 228 to alter the manner in which they generate code.

<Option number> represents an option. <Parameter list> represents a sequence of zero or more parameters. The number and interpretation of <parameter list> depend on the value of <option number>.

OPTN HPcode-Plus instructions may be located in only specific parts of the HPcode-Plus Object file 1150, 1160. For example, some OPTN HPcode-Plus instructions, depending on the value of <option number>, may be located anywhere within a procedure. Others must be located outside the procedure (i.e., before a KIND_FUNCTION SYM instruction).

In general, OPTN, once set, remains in effect until it is reset.

Possible values for <option number> are listed below:

LANGUAGE TYPE
WARNING LEVEL
CODE LISTING
LOCALITY SET
INIT
SYMBOLIC DEBUG
COPYRIGHT
PROGRAM ENTRY PT
HPcode Plus VERSION
COMPILATION REC
OPTIMIZATION
ASSEMBLER FILE
OBJECT FILE
USER VERSION
ROUNDING MODE
CONVERSION OVERFLOW CHK
ARITHMETIC OVERFLOW CHK
PROCEDURE SIDE EFFECT
LIBRARY FILE
PROGRAM FILE

2.5.49. PAR—PARameter

The syntax of HPcode-Plus instruction PAR is presented below:

PAR

PAR pops <value> from the expression stack. PAR stores <value> into the parameter area of a procedure to be called.

2.5.50. REM—REMainder

The syntax of HPcode-Plus instruction REM is presented below:

REM

REM pops <left op> and <right op> from the expression stack. A division <left op>/<right op> is performed to produce a result. The result represents the remainder of the division operation. For example, 4/2 equals 0, 5/2 equals 1, and −5/2 equals −1.

The result is then pushed onto the expression stack.

2.5.51. RET—Return

The syntax of HPcode-Plus instruction RET is presented below:

RET

RET returns program control from a called procedure to a calling procedure. Before returning programming control, RET restores the static and dynamic computing environment of the calling procedure. If the current procedure is a program entry point, normal program termination will occur.

The expression stack must be empty before RET is executed.

2.5.52. RND—Round

The syntax of HPcode-Plus instruction RND is presented below:

RND <result dtype>

RND pops <real value> from the expression stack. if <real value> is positive, then RND adds 0.5 to <real value> to produce a temporary result. If <real value> is negative, then RND adds −0.5 to <real value> to produce the temporary result.

The integer part of the temporary result is converted to the data type indicated by <result dtype> and then pushed onto the expression stack.

2.5.53. ROT—ROTate

The syntax of HPcode-Plus instruction ROT is presented below:

ROT

ROT rotates the top three items on the expression stack. For example, suppose the expression stack contains <op1> <op2> <op3> before ROT, where <op1> is the top of the expression stack. After ROT, the expression stack would contain <op3> <op1> <op2>, where <op3> is the top of the expression stack.

2.5.54. SHFT—SHiFT

The syntax of HPcode-Plus instruction SHFT is presented below:

SHFT <direction>

SHFT pops <item> and <shift count> from the expression stack. SHFT then shifts <item> by <shift count> bit positions to produce a result. The result is pushed onto the expression stack.

When <direction> is 0, <item> shifts either right or left, depending on the sign of <shift count>. If the ANDF Producer 208 knows the shift direction, then <direction> should be set to 1 for a left shift and to −1 for a right shift. <Shift count> must be positive when <direction> is 1 or −1.

The meaning of SHFT depends on the data type of <item>. For signed integers, an arithmetic shift is performed. For unsigned integers, a logical shift is performed.

Since the result depends on the size of <item>, SHFT must be used with caution. ANDF Installers 218, 228 may generate a warning when SHFT is used.

2.5.55. STFN—STore FuNction result

The syntax of HPcode-Plus instruction STFN is presented below:

STFN

STFN is used to return a function result. Specifically, STFN pops <value> from the expression stack. STFN then stores <value> in the memory return area set aside by HPcode-Plus instruction CUP. The data type of <value> must match the function's return value data type defined in the KIND_FUNCTION SYM instruction.

2.5.56. STR—STORe

The syntax of HPcode-Plus instruction STR is presented below:

STR <variable symid>

STR pops <value> from the expression stack and stores <value> into the variable specified by <variable symid>. The data type of <value> must match that of <variable symid>.

If <variable symid> represents the symbolic id of a constant (i.e., the constant attribute is set), then the behavior of STR is implementation dependent. In such cases, the ANDF Installers 218, 228 generate a warning message.

2.5.57. SUB—SUBtract

The syntax of HPcode-Plus instruction SUB is presented below:

SUB

SUB pops <left op> and <right op> from the expression stack. A subtraction <left op>-<right op> is performed to produce a result. The result, having the same data type as <left op> and <right op>, is then pushed onto the expression stack.

When <left op> and <right op> represent two data addresses, then the result will be a scaled integer of TYPE_INT (the result is scaled as with INC/IXE, but in a reverse manner). Data objects pointed to by <left op> and <right op> must have the same data type. The behavior of such pointer subtraction is implementation dependent.

2.5.58. SWP—SWaP

The syntax of HPcode-Plus instruction SWP is presented below:

SWP

SWP pops the top two stack items and pushes them back onto the expression stack such that their stack positions are reversed.

2.5.59. SYM—SYMbol Table

The syntax of SYM is presented below:

SYM <symid> <sym kind> <sym info>

SYM is used to defer memory allocation from the ANDF Producer 208 to the ANDF Installers 218, 228. Specifically, through SYM, variable, type, and constant information is conveyed from the ANDF Producer 208 to the ANDF Installers 218, 228. The ANDF Installers 218, 228 use this information to perform memory allocation, alignment, initialization, and machine dependent constant folding.

The ANDF Producer 208 use SYM to give a unique symbolic identification (also called symid or symbolic id) to each data object and data type. The only exception to this rule is that the symid of data types and data objects in local scopes can be reused.

The ANDF Producer 208 also uses the SYM instruction to associate a memory type (e.g., Static, Local, or Parameter) and attribute (e.g., Constant, Register, or Volatile) with each data object.

SYM parameters (or fields) symid, sym kind, and sym info are described in the following sections.

2.5.59.1. Symid

Symid stands for Symbolic Identifier. Symids are used by HPcode-Plus instructions to refer to variables, data types, and constants. For example, rather than using an actual physical address to access a data object in memory, HPcode-Plus instructions use the data object's symid.

The ANDF Producer 208 assigns symid values starting at 256, although assignment need not be sequential. The ANDF Producer 208, however, does not assign symid values greater than 65535 unless all smaller values have been used.

The ANDF Installers 218, 228 must accept symids with values up to at least 65535.

HPcode-Plus includes predefined symids for predefined data types listed in FIG. 5. These data types are the only ones that need not be explicitly defined by SYM HPcode-Plus instructions. The predefined symids are presented in FIG. 9.

The size of the predefined data types depends on the target computer platform 216, 226 and is determined by the ANDF Installer 218, 228. Thus, TYPE_INT can be 16 bits on one computer platform and 32 bits on another. All that the ANDF Producer 208 can rely on is certain minimum ranges, and that TYPE_SHORTINT is no larger than TYPE_INT and TYPE_INT is no larger than TYPE_LONGINT.

A function begins with a KIND_FUNCTION declaration and terminates with a matching KIND_END. Properly nested functions, as in Pascal, might exist. The nesting structure is determined implicitly by the placement of KIND_FUNCTION and KIND_END SYM HPcode-Plus instruction pairs.

Certain symids, such as the KIND_DVAR declarations of dynamic variables and the KIND_FPARAM declarations of formal parameters are also implicitly associated with the nearest enclosing function.

When the function is terminated by the matching KIND_END, all local symid declarations of associated interior objects become unavailable. The ANDF Producer 208 may reuse any of these "freed" symid values in new SYM declarations. The ANDF Producer 208 reuses such symid values to minimize the size of tables at the ANDF Installers 218, 228.

In addition, the ANDF Producer 208 can explicitly tell the ANDF Installer 218, 228 that other symid values (such as a type declaration) are "freed" upon function termination. This is done by using a <free> parameter in those symid declarations. If the <free> parameter is 0, then the symid value will not be freed. If the <free> parameter is 1, then the symid value is associated with the nearest enclosing function and when the function is terminated, the symid value is freed.

2.5.59.2. Sym Kind and Sym Info

<Sym kind> and <sym info> are fields which contain symbolic kind and symbolic information, respectively. The structure of <sym info> depends on the value of <sym kind>. Possible values of <sym kind> are presented in FIG. 10.

Listed below are descriptions showing the relationship of <sym kind> and <sym info>. These descriptions contain definition and usage information.

2.5.59.2.1. KIND_POINTER

Syntax: SYM <symid> KIND_POINTER <free> <type> [<name>]

This SYM variation defines a data object pointer type.

<free> is a flag which indicates whether <symid> is freed when the nearest enclosing function is terminated.

<type> is a symbolic id for the data type that the v pointer is to point to. <Type> must represent a data type and may either be a HPcode-Plus predefined data type (listed in FIG. 5), an existing symbolic id type, or a forward reference to a symbolic id type. In the last case, it is permissible to never supply the missing reference, as long as information about the missing type is not needed. To define a pointer type to a function, see the KIND_FUNC_PTR SYM entry, below.

<name> is a name which is used to reference the pointer type during symbolic debug operations.

2.5.59.2.2. KIND_STRUCTURE

Syntax: SYM <symid> KIND_STRUCT <free> <first field> <packing> [<name>]

This SYM variation defines a structure data type.

<free> is a flag which indicates whether <symid> is freed when the nearest enclosing function is terminated.

<first field> is a symbolic id of the first field in a structure. This may be a forward reference to a symbolic id. <First field> may also be a special value 0, indicating an incomplete structure definition which may be completed later. Symbolic ids of field definitions are chained together in a list by use of the KIND_FIELD symbolic declaration. All fields of the structure must be declared before the size of the structure is needed.

<packing> is a flag which indicates whether the structure has normal, packed, or crunched packing.

Normal packing implies that the ANDF Installer 218, 228 packs fields and array elements in a manner which is consistent with the packing method of the target computer platform 216, 226.

Packed implies that the ANDF Installer 218, 228 packs fields and array elements in a manner which is consistent with the packed packing method of the target computer platform 216, 226. Languages like Pascal allows users to specify PACKED packing for arrays and structures.

Crunched packing implies that the ANDF Installer 218, 228 may not expand fields and may not leave holes. Every field is bit aligned to conserve space.

<name> is a name which is used to reference the structure type during symbolic debug operations.

2.5.59.2.3. KIND_UNION

Syntax: SYM <symid> KIND_UNION <free> <first field> [<name>]

This SYM variation defines a union data type.

<free> is a flag which indicates whether <symid> is freed when the nearest enclosing function is terminated.

<first field> is a symbolic id of the first field in the union. This may be a forward reference to a symbolic id. <First field> may also be the special value 0, indicating an incomplete union definition which may be completed later. Symbolic ids of the field definitions are chained together in a list by use of the KIND_FIELD symbolic declaration. All fields of the union must be declared before using the size of the union.

<name> is a name which is used to reference the union type during symbolic debug operations.

Pascal variant records can be implemented in HPcode-Plus as a structure whose last field is a union of structures.

2.5.59.2.4. KIND_ARRAY

Syntax: SYM <symid> KIND_ARRAY <free> <size> <type> <packing> [<name>]

This SYM variation defines a structure of an array.

<free> is a flag which indicates whether <symid> is freed when the nearest enclosing function is terminated.

<size> indicates the number of elements in the array. <Size> may be a simple integer constant, or a symid (using the #n notation) of an already defined symbolic constant or variable (in languages which support dynamic sizes, such as FORTRAN and Ada). <Size> is set to the constant 0 to specify an array with unknown size. The array's definition is later completed with an additional SYM HPcode-Plus instruction.

A multi-dimensional array is defined to be an array of arrays.

<type> is a symbolic id which indicates the data type of each element of the array.

<packing> is a flag indicating the type of packing desired as in the description for KIND_STRUCT, above.

2.5.59.2.5. KIND_ENUM

Syntax: SYM <symid> KIND-ENUM
<free> <member> <base type> [<name>]

This SYM variation defines an enumerated type.

<free> is a flag which indicates whether <symid> is freed when the nearest enclosing function is terminated.

<member> is a symbolic id of the first member declaration. <member> may be a forward reference to a symbolic id. <member> may also be a special value 0, indicating an incomplete enumerated type definition which may be completed later. Symbolic ids of the member definitions are chained together in a list by use of the KIND_MEMBER symbolic declaration. All members of the enumerated type must appear before using the size of the enumerated type.

<base type> is a symid of a predefined integral type. When a member of the enumerated type is located on the HPcode-Plus expression stack, an implicit type conversion to the <base type> is performed. Similarly, items of the <base type> on the stack may be stored into variables of the enumeration type without an explicit conversion.

<name> is a name which is used to reference the enumerated type during symbolic debug operations.

Note that the width of the enumerated type is not required to be the same as the width of the <base type>. The actual size of a variable of enumerated type is decided by the ANDF Installer 218, 228. The actual size should be a multiple of the size of TYPE CHAR. In a crunched structure or array, the size of an enumerated type field or element should be as small as possible.

2.5.59.2.6. KIND_FUNCT PTR

Syntax: SYM <symid> KIND_FUNC_PTR
<free> <return type> [<name>]

The SYM variation defines a "pointer to a procedure" data type.

<free> is a flag which indicates whether <symid> is freed when the nearest enclosing function is terminated.

<return type> is a symbolic id of the data type returned by the procedure.

<name> is a name which is used to reference the function pointer type during symbolic debug operations.

2.5.59.2.7. KIND_MODIFIER

Syntax: SYM <symid> KIND_MODIFIER
<free> <modification> <type> [<name>]

This SYM variation defines a modified type of an existing type declaration. The original data type and the modified data type are compatible.

<free> is a flag which indicates whether <symid> is freed when the nearest enclosing function is terminated.

<modification> is a flag with possible values 0, 1, or 2.

A <modification> value of 0 indicates that the new data type is a synonym of the original data type (with possibly a different name for symbolic debug purposes).

A <modification> value of 1 indicates the addition of a constant attribute to the original data type. Variables with the constant attribute may not be modified and may be placed into read only memory. No checking need be done by the ANDF Installer 218, 228 to ensure that constant variables are not actually modified.

A <modification> value of 2 indicates the addition of a volatile attribute to the original data type. Variables with the volatile attribute have limitations placed on the amount of cacheting the ANDF Installer 218, 228 can do on their values.

<name> is a name which is used to reference the modified data type during symbolic debug operations.

2.5.59.2.8. KIND_FIELD

Syntax: SYM <symid> KIND FIELD
<type> <field> [<name>][<bit length>]

This symbolic variation declares a field within a structure or union. This declaration is neither a type nor a variable declaration. Outside of their definition in SYM instructions, field symbolic ids are used in IXF HPcode-Plus instructions and in SYM initialization of unions.

<type> is a symbolic id of the type of the field.

<field> is a symbolic id of the next field in the structure or union, if there is one. Otherwise, this parameter is 0. This may be forward reference.

<name> is a name which is used to reference the field during symbolic debug operations.

<bit length> is either an integer constant or a symbolic id of a integral constant (in #n notation). This indicates the length of the field in bits. A <bit length> of 0 indicates an alignment directive in the structure (even in crunched structures). A <bit length> of −1 or one that is missing altogether indicates that the field should have the same number of bits as free variables of the field <type>.

The symid associated with KIND_FIELD is freed at the termination of the nearest enclosing function, if and only if the symid of the structure or union is freed.

2.5.59.2.9. KIND_FUNCTION

Syntax: SYM <symid> KIND_FUNCTION
<type> <flag> <fparam> [<visible name>][<name>]

This SYM variation marks the start of a function definition. There must be a matching KIND_END SYM HPcode-Plus instruction to terminate the function. Function definitions may be properly nested.

<type> is a symbolic id of the type returned by the function.

<flag> is a flag which indicates whether the function accepts a fixed number or a variable number of arguments.

<fparam> is a symbolic id of the first formal parameter (defined by a KIND_FPARAM SYM HPcode-Plus instruction) in a list of formal parameters for the procedure/function. This parameter should be 0 if there are no parameters. This may be a forward reference to a symbolic id.

<visible name> is a name of the procedure that external compilation units use to reference the procedure. It is used by a linker (not shown in FIG. 2) for resolution. If no external references are allowed, then this parameter can be missing or the empty name, "", can be provided.

<name> is an internal name for the procedure. <name> and <visible name> may be different. <name> may be passed to a linker (not shown in FIG. 2) for informative purposes. <name>, however, is local. Thus, <name> may not be used to resolve external references.

The symids associated with KIND_FUNCTION SYM HPcode-Plus instructions are freed when the nearest enclosing functions are terminated.

2.5.59.2.10. KIND FUNC DCL

Syntax: SYM<symid> KIND_FUNC_DCL <free><type>[<visible>][<name>]

This SYM variation declares a procedure or function which may be external to the compilation unit.

<free> is a flag which indicates whether <symid> is freed when the nearest enclosing function is terminated.

<type> is a symbolic id of the type returned by the function.

<visible name> is a name that is used to reference the procedure. It is used by the linker (not shown in FIG. 2) for resolution.

<name> is an internal name which is used during symbolic debug operations.

2.5.59.2.11. KIND_FPARAM

Syntax: SYM<ymid> KIND_FPARAM <type><next fparam><memory>[<name>]

This SYM variation declares a formal parameter of a procedure or function.

<type> indicates the type of the formal parameter.

<next fparam> is a symbolic id of the next formal parameter in the list. If this parameter is 0, then there are no more formal parameters. This may be a forward reference.

<memory> is a flag with possible values 0 or 1. This indicates a hint to the ANDF Installer 218, 228 on whether it should try to allocate the parameter in normal (0) or "fast" (1) memory.

<name> is a name which is used to reference the formal parameter during symbolic debug operations.

The symid associated with a KIND_FPARAM SYM HPcode-Plus instruction is freed when the nearest enclosing function is terminated.

2.5.59.2.12. KIND_SVAR

Syntax: SYM<symid> KIND_SVAR <free><type><imported>[<visible name>][<name>]

This SYM variation declares a static variable (with respect to storage).

<free> is a flag which indicates whether <symid> is freed when the nearest enclosing function is terminated.

<type> is a symbolic id of the type of the variable.

<imported> is a flag with the possible values 0 or 1. <imported> indicates whether the variable is defined in this compilation unit (0) or is an external reference (1).

<visible name> is a name which is used by the linker (not shown in FIG. 2) to resolve references. <visible name> must be present if this is an external declaration. If no external references are allowed for a defined variable (e.g. a static definition), then this parameter can be missing or the empty name, "", can be provided.

<name> is an internal name of the variable in case <visible name> is not the same. <name> may be passed to the linker for informative purposes. <name>, however, is a local name. Thus, <name> may not be used to resolve references.

2.5.59.2.13. KIND_DVAR

Syntax: SYM<symid> KIND_DVAR <type><memory>[<name>]

This SYM variation declares a dynamic variable (i.e. locals or temporaries).

<type> indicates the symbolic id of the type of the variable.

<memory> is a flag with possible values 0 or 1. This indicates a hint to the ANDF Installer 218, 228 on whether it should try to allocate the parameter in normal (0) or "fast" (1) memory.

<name> is a name which is used to reference the variable during symbolic debug operations.

The symid associated with a KIND DVAR is freed when the nearest enclosing function is terminated.

2.5.59.2.14. KIND MEMBER

Syntax: SYM <symid> KIND_MEMBER <member>[<name>][<value>]

This SYM variation defines a member of a enumerated type. <symid> may be used by the ANDF Producer 208 in a LOD HPcode-Plus instruction.

<member> is a symbolic id of the next member of the enumerated type defined by a KIND MEMBER entry. This may be a forward reference. If this parameter is 0, then this is the last member of the enumerated type.

<name> is a name which is used to reference the member during symbolic debug operations.

<value> is either an integer constant or the symbolic id of a integral constant (in #n notation). If this <value> is missing, then the value is equal to the previous member's value plus 1, or 0 if this is the first member.

Symids associated with KIND_MEMBER HPcode-Plus instructions are freed upon the termination of the nearest enclosing function, if and only if the symid of the enumerated type is also freed.

2.5.59.2.15. KIND_OFFSETOF Syntax: SYM <symid> KIND_OFFSETOF <free> <struct> <field>[<result type>]

This SYM variation defines a symbolic id for the constant offset in bytes of a field from the beginning of the enclosing structure.

<free> is a flag which indicates whether <symid> is freed when the nearest enclosing function is terminated.

<struct> is a symbolic id of the structure type.

<field> is a symbolic id of the field whose offset is to be returned.

<result type> is a symbolic id of the type of this symid constant. If <result type> is not specified, then the result is of TYPE_UNS_INT.

2.5.59.2.16. KIND_SIZEOF

Syntax: SYM <symid> KIND_SIZEOF <free> <data type> [<result type>]

This SYM variation defines a symbolic id for the constant size of a data type expressed as a number of TYPE_CHAR sized units.

<free> is a flag which indicates whether <symid> is freed when the nearest enclosing function is terminated.

<data type> is a symbolic id of the type whose size is determined.

<result type> is a symbolic id of the type of <symid>constant. If this is not specified, the result is of TYPE_UNS_INT.

2.5.59.2.17. KIND MAXOF

Syntax: SYM <symid> KIND_MAXOF <free> <data type>

This SYM variation defines a symbolic id for the constant maximum representable value for the specified type.

<free> is a flag which indicates whether <symid> is freed when the nearest enclosing function is terminated.

<data type> is a symbolic id of the type whose maximum value is determined. The result type is always <data type>.

2.5.59.2.18. KIND_MINOF

Syntax: SYM <symid> KIND_MINOF <free> <data type>

This SYM variation defines a symbolic id for the constant minimum representable value for the specified type.

<free> is a flag which indicates whether <symid> is freed when the nearest enclosing function is terminated.

<data type> is a symbolic id of the type whose minimum value is determined. The result type is always <data type>.

2.5.59.2.19. KIND_CONST

Syntax: SYM <symid> KIND_CONST <free> <type> <constant value list> [<"name">]

This SYM variation defines a constant. The constant may be a simple value, a structure constant, or a list of values in an array.

<free> is a flag which indicates whether <symid> is freed when the nearest enclosing function is terminated.

<type> designates a symbolic id of the type of the constant.

<constant value list> are values that are used to initialize the constant.

<name> is a name which is used to reference the constant during symbolic debug operations.

A specification of single scalar items or scalar items contained within an aggregate list is described in the following table:

| Type | Scalar Items Description | Example |
|---|---|---|
| Integral or Character | integer | 123 |
| | single quoted character | "a" |
| | constant symbolic id | ;300 |
| Data Pointer | False | 0 |
| | True | 1 |
| | constant symbolic id | ;301 |
| Floating | real number in ANSI-C syntax | 5.3e10 |
| | constant symbolic id | ;302 |
| | NIL | 0 |
| Data Pointer | NEW_CONST symbolic id | ;304 |
| | NIL | 0 |
| FUNC_PTR | NEW_CONST symbolic id | ;307 |

To specify an array or structure aggregate, items are listed in order, enclosed by brackets []. For arrays, items are placed in subsequent array elements. For structures, each item in the list is placed into the corresponding field position. To facilitate readability of the HPcode-Plus Object file, the newline character is treated as ordinary white space between enclosing brackets. That is, an aggregate's initialization list may span multiple lines.

Not all items in the aggregate need to be initialized.

To initialize nested aggregates, the nested aggregate can be specified by a sub-list delimited by brackets. The nested aggregate can also be represented by a single symbolic id of an already defined constant of the nested aggregate type. Multi-dimensional arrays are initialized in row-major order.

An empty pair of quotes, "", denotes a non-initialized item in the list.

Adjacent items in a list initialized by quoted characters may be joined together within a single pair of quotes. For example, "a" "b" "c" may be written as "abc".

Duplicated items in a list may be specified by repeat*item, where repeat is an integer or a symbolic id of an integer in #n notation. Adjacent non-initialized items may be specified by repeat*"".

To initialize a union, the first item in the list is a field symid (in #n notation) denoting which field of the union is being initialized.

2.5.59.2.20. KIND_NEW_CONST

Syntax: SYM <symid> KIND_NEW_CONST <free>

This SYM variation defines a new constant. The new constant is defined by HPcode-Plus instructions which follow the KIND_NEW_CONST SYM HPcode-Plus instruction.

The KIND_NEW_CONST SYM HPcode-Plus instruction allows the ANDF Producer 208 to transfer constant folding activities to the ANDF Installer 218, 228 while being able to use a symbolic id to represent the constant folding result. Any HPcode-Plus instructions can be used to generate the constant, except for procedure calls, branches, loads from variables, and stores to variables. The operands and parameters of all HPcode-Plus instructions in the sequence must represent known constants available to the ANDF Installer 218, 228.

At the end of the HPcode-Plus instruction sequence, there must be a single item on the expression stack with a constant value. The value and type of this item are associated with the symbolic id of the KIND_NEW_CONST.

KIND_NEW_CONST constructors may be nested.

The ANDF Installers 218, 228 are not required to pre-evaluate the instructions in KIND_NEW_CONST sequences, but the HPcode-Plus program must behave as if they did. For example, if the symbolic id of a KIND_NEW_CONST is used as the <size> specifier in a KIND_ARRAY declaration, the effect must be as if an ordinary integer value were specified.

Certain expressions must be passed from the ANDF Producer 208 to the ANDF Installer 218, 228 for evaluation. For example, expressions like "a"+6 that involve computation with values of characters must be passed to the ANDF Installer 218, 228. In general, any expression involving machine dependencies must be deferred to the ANDF Installer 218, 228. But a constant expression such as 3+5 which is guaranteed to fit in the minimum range specified for TYPE_INT may be folded by the ANDF Producer 208.

<free> is a flag which indicates whether <symid> is freed when the nearest enclosing function is terminated.

2.5.59.2.21. KIND_MACRO

Syntax: SYM <symid> KIND_MACRO <free> <number of macro parameters>

This SYM variation starts the definition of a macro. The macro is defined by HPcode-Plus instructions which follow the KIND_MACRO SYM HPcode-Plus instruction. The macro is terminated by a matching KIND_END SYM HPcode-Plus instruction.

Inside the body of the macro, formal parameters are represented by %1 for the first parameter, %2 for the second parameter, and so on. When invoked by a MCAL HPcode-Plus instruction, the formal parameters will be substituted by the corresponding actual arguments.

The ANDF Producer 208 searches through the compiler intermediate representation 212 for sequences of HPcode-Plus instructions which repeat. The ANDF Producer 208 can then use the KIND_MACRO SYM HPcode-Plus instruction to define that repeating sequence of HPcode-Plus instructions as a macro, and then call that macro as required with the MCAL HPcode-Plus instruction.

The following restrictions on the definition and use of macros exist:

Macros may not be defined within macros.
Macros may not make recursive calls to itself (either directly or indirectly through other macros).
The number of actual parameters must equal the number of formal parameters.
The macro definition must appear before its invocation.

Care must be taken when including labels inside macros. Either labels should be parameters of the macro, or else the macro should only be invoked once within a function (because labels must be unique).

<free> is a flag which indicates whether <symid> is freed when the nearest enclosing function is terminated.

2.5.59.2.22. KIND_END

Syntax: SYM <symid> KIND END

This SYM variation is used to terminate definitions of previous KIND_FUNCTION, KIND_NEW_CONST, and KIND_MACRO SYM HPcode-Plus instructions. <symid> must match the <symid> of the terminated SYM HPcode-Plus instructions.

If the terminated SYM HPcode-Plus instruction was of type KIND_FUNCTION, then the scope of the function ends and all interior symids associated with the function are freed.

2.5.59.2.23. KIND_SRCFILE

Syntax: SYM <symid> KIND SRCFILE <langtype> <LOC #of start of code>

This SYM variation defines characteristics of a source file. If the symbolic debug option is turned on, the ANDF Producer 208 must emit this SYM HPcode-Plus instruction at the start of each source file, the start of each included file, and the return from each included file. Additional KIND_SRCFILE SYMs may optionally be emitted to the compiler intermediate representation 212 before each KIND_FUNCTION SYM HPcode-Plus instruction for those languages that permit the turning on and off of debug information within the source via compiler options. This guarantees that debuggers can determine the origin of functions. KIND_SRCFILE SYM HPcode-Plus instructions must appear before KIND_FUNCTION SYM HPcode-Plus instructions.

<"name"> may be either absolute or relative names. Names of ANSI-C include files can be given in "<filename>" format.

<langtype> is an integer which indicates a source language, as below:

| 0 | LANG UNKNOWN |
|---|---|
| 1 | LANG C |
| 2 | LANG F77 |
| 3 | LANG PASCAL |
| 4 | LANG COBOL |
| 5 | LANG BASIC |
| 6 | LANG ADA |

<LOC #of start of code> is a line number given by the ANDF Producer 208 to the first line of code inside the source file used in the LOC HPcode-Plus instruction.

2.5.59.2.24. KIND_LABEL

SYM <symid> KIND_LABEL <LOC #> <"name">

This SYM variation defines a label. If the symbolic gdebug option is turned on, one KIND_LABEL SYM HPcode-Plus instruction should be emitted for each source program statement label.

<"name"> is the name of the label.

<LOC #> is the line number associated with the label used in the LOC HPcode-Plus instruction.

2.5.59.3. Incomplete Declarations

The ANDF Producer 208 may generate incomplete KIND_ARRAY, KIND_STRUCT, KIND_UNION, and KIND_ENUM SYM HPcode-Plus instructions. That is, the array size or first field or first member may not be defined. In such cases, the ANDF Producer 208 generates a first SYM instruction with a placeholder value of 0. Later, when the ANDF Producer 208 has more complete information, a second SYM instruction of the same kind, using the same symid, is generated to fill in the missing information. Until the second SYM instruction is completed, the ANDF Installer 218, 228 is not required to know the size of the data object.

2.5.60. TJP—True JumP

The syntax of HPcode-Plus instruction TJP is presented below:

TJP <label>

TJP pops <condition> from the expression stack. <Condition> must be the only item on the expression stack when TJP is executed.

TJP causes program control to branch to <label> if <condition> is TRUE. A LAB HPcode-Plus instruction, within the current procedure, must define <label>.

2.5.61. UJP—Unconditional JumP

The syntax of HPcode-Plus instruction UJP is presented below:

UJP <Label>lo; UJP causes program control to branch unconditionally to <label>. A LAB instruction, within the current procedure, must define <label>. The expression stack must be empty when UJP is executed.

2.5.62. XOR—logical exclusive OR

The syntax of HPcode-Plus instruction XOR is presented below:
XOR

XOR pops <op1> and <op2> from the expression stack. A logical XOR operation, <op1> XOR <op2>, is performed to produce a result. The result, having the same data type as <op1> and <op2>, is pushed onto the expression stack.

When <op1> and <op2> represent integer or character data values, a bitwise XOR is performed.

3. ANDF Producer

FIG. 11 presents a detailed block diagram of the ANDF Producer 208 of the present invention. The ANDF Producer 208 is made up of two components: a Preprocessor 1114 and a Compiler 1122. As shown in FIG. 11, in an alternative embodiment of the present invention the ANDF Producer 208 also includes a High-Level Optimizer 1144 and an Archiver/Linker 1154.

These four components are described in the following sections.

3.1. Preprocessor

The Preprocessor 1114 receives ANSI-C Source files 202 (which contain machine independent computer programs), user-defined header files 1102, system-specific header files 1104, and standard header files 1106.

The Preprocessor 1114 expands object-like macros and function-like macros found in ANSI-C Source files 202. In other words, the Preprocessor 1114 handles #define and #include directives (and related features such as #ifdef).

An example of the object-like macro is shown below:
define NULL 0

An example of the function-like macro is shown below:
define offsetof(_s_name, _m _name) ((size_t)&(-((_s_name*)0)—>_m_name))

After expansion of object-like macros and function-like macros, the ANSI-C source file 202 is called an expanded machine independent computer program. The Preprocessor 1114 places the expanded machine independent computer program into a Preprocessed Source file 1118.

In performing macro expansion and textual substitution, the Preprocessor 1114 makes use of header files. These header files can be classified into three categories:

user-defined header files 1102,
system-specific header files 1104, and
standard header files 1106.

User-defined header files 1102 are created by computer programmers. By definition, User-defined header files 1102 are specific to particular users.

System-specific header files 1104 are, as the name implies, specific to particular computer platforms 206, 218, 228. As a general rule, the machine independent computer programs 202 should not contain references to System-specific header files 1104 (unless the object-like and function-like macros contained in such header files are written in a machine independent manner, and are available on both the native computer platform 206 and the target computer platforms 216, 226).

Standard header files 1106 are those which are specified by the ANSI-C standard. They are listed below.

| <assert.h> | <locale.h> | <stddef.h> |
| <ctype.h>  | <math.h>   | <stdio.h>  |
| <errno.h>  | <setjmp.h> | <stdlib.h> |
| <float.h>  | <signal.h> | <string.h> |
| <limits.h> | <stdard.h> | <time.h>   |

Computer platforms 206, 218, 228 must contain complete copies of the standard header files 1106. The contents of the standard header files 1106, however, may differ among computer platforms 206, 218, 228. For example, object-like macros, function-like macros, and type definitions which are defined one way on one computer platform may be defined differently on another computer platform. Thus, the standard header files 1106 may be dependent on particular computer platforms 206, 218, 228. Nevertheless, the ANDF Producer 208 must accept computer programs 202 that use standard header files 1106 and must ensure that the standard header files 1106 behave as if they were compiled at the target computer platforms 216, 226.

The Preprocessor 1114 solves this problem by using a mechanism to defer the translation of macro and type definitions found in standard header files 1106 until install time (i.e., until the ANDF Installer 218, 228 installs the computer program 202 at the target computer platform 216, 226).

Specifically, all standard header files 1106 are modified by substituting unique key words for data type identifiers, object-like macro identifiers, and function-like macro identifiers contained in the standard header files 1106. In the preferred embodiment of the present system, the unique key words are equal to the data type identifiers, object-like macro identifiers, and function-like macro identifiers themselves, with the addition of a prefix "_ANDF_".

The proposed solution is illustrated in the following example. The standard header file stddef.h (called Stddef.h Unmodified for reference purposes) contains the following statements.

```
#define  NULL   0
typedef unsigned int   size_t;
typedef unsigned int   wchar_t;
typedef unsigned int   ptrdiff_t;
#define offsetof(_s_name, _m_name)
   ((size_t)&(((_s_name*)0)->_m_name))
```

Identifiers such as "NULL" are called object-like macro identifiers. Identifiers such as "size_t" are called data type definition identifiers. Identifiers such as "offsetof" are called function-like macro identifiers. These identifiers are defined in the standard header file stddef.h.

A modified ANDF version of stddef.h (called Stddef.h Modified for reference purposes) contains the following statements.

```
#define NULL _ANDF_NULL
#define size_t _ANDF_size_t
#define wchar_t _ANDF_wchar_t
#define ptrdiff_t _ANDF_ptrdiff_t
#define offsetof(_s_name,_m_name)
   _ANDF_offsetof(_s_name,_m_name)
```

Statements such as "#define NULL _ANDF_NULL" and "#define size_t_ANDF_size_t" are called object-like macro definitions Statements such as "#define offsetof(_s_name,_m_name) _ANDF_offsetof(_s_name, _m_name)" are called function-like macro definitions. The object-like macro definitions assign unique key words to object-like macro identifiers and type definition identifiers. The function-like macro definitions assign unique key words to function-like macro identifiers.

The Preprocessor 1114 uses Stddef.h Modified for macro expansion. Consider the following program excerpt:

```
#include <stddef.h>
main()
{
    struct s {
        size_t  i;
        wchar_t  j;
        ptrdiff_t  p;
    };
    struct s x;
    int a;
    a = offsetof(struct s,j);
    a = NULL;
    ..
```

A translation of the above program excerpt by the Preprocessor 1114, using stddef.h modified, is presented below. The translation is the expanded machine independent computer program. The expanded machine independent computer program is placed in the Preprocessed Source file 1118. Object-like macros and function-like macros which contain the prefix "_ANDF_" are called expanded object-like macros and expanded function-like macros.

```
main()
{
    struct s {
        _ANDF_size_t  i;
        _ANDF_wchar_t  j;
        _ANDF_ptrdiff_t  p;
    struct s x;
    int a;
    a = _ANDF_offsetof(struct s, j);
    a = _ANDF_NULL;
    ..
```

The task of the Preprocessor 1114 is complete. We will now consider the operation of the Compiler 1122 and the ANDF Installer 218, 228 with respect to the processing of standard header files 1106 (the Compiler 1122 and the ANDF Installer 218, 228 are further described in Sections 3.2 and 4.0, respectively).

As shown in FIG. 11, the Compiler 1122 receives the Preprocessed Source file 1118 as input. As described in Section 3.2, the Compiler 1122 translates the expanded machine independent computer program contained in the preprocessed source file 1118 into HPcode-Plus instructions.

The Compiler 1122 knows, however, that it cannot completely translate unique key words (i.e., those words beginning with "_ANDF_"). The translation of unique key words must be deferred to the ANOF Installer 218, 228 (that is, the ultimate interpretation of the data type definitions, the object-like macro identifiers, and the function-like macro identifiers are deferred to the AND Installer 218, 228). Therefore, the Compiler 1122 translates source code containing unique key words into HPcode-Plus instructions containing negative symbolic id's.

Negative symbolic id's represent place-holders. They are system defined and reserved symbols that map into the unique key words (which correspondingly map int the object-like and function-like macro identifiers). Upon encountering a negative symbolic id, the ANDF Installer 218, 228 exchanges data type definition expansions, object-like macro expansions, and function-like macro expansions for the negative symbolic ids. The data type definition expansions, object-like macro expansions, and function-like macro expansions are defined and dependent upon the target computer platforms 216, 226.

For example, the Compiler 1122 translates the contents of the above Preprocessed Source file 1118 into the following HPcode-Plus instructions. As shown in FIG. 11, these HPcode-Plus instructions are stored in HPcode-Plus Object file 1160.

```
SYM 401 KIND_STRUCT 1 402 0 "s"
    ; defining structure s
SYM 402 KIND_FIELD -2 403 "i"
    ; defining field i has type -2 = _ANDF_size_t
SYM 403 KIND_FIELD -3 404 "j"
    ; defining field j has type -3 = _ANDF_wchar_t
SYM 404 KIND_FIELD -4 0 "p"
    ; field p has type -4 = _ANDF_ptrdiff_t
SYM 405 KIND_DVAR 4010 "x"
    ; defining local variable x as a structure s
SYM 406 KIND_DVAR TYPE_INT 0 "a"
    ; defining local variable a
MCAL -5 401 403
```

```
                ; calling the macro _ANDF_offsetof
CVT TYPE_INT
                ; convert to target type
STR 406
                ; store in "a"
LOD −1
                ; load "_ANDF_NULL"
CVT TYPE_INT
STR 406
                ; store in "a"
  . .
```

The data type definition expansions, and object-like and function-like macro expansions which correspond to the reserved negative symbolic id's are defined and stored in a standard ANDF header file called adf.h. Andf.h exists on every install site 216, 226, but its contents might vary from one install site 216, 226 to another. The contents of andf.h for the modified ANDF versionf stddef.h, i.e., Stddef.h Modified, are presented below (Again, the actual contents of andf.h may vary from one install site 216, 226 to another. Also, the name of andf.h may vary from one install site 216, 226 to another.).

```
SYM −1 KIND_CONST TYPE_INT 1 "_ANDF_NULL"
        ; define NULL as an int constant 1
SYM −2 KIND_MODIFIER 0 0 TYPE_UNS_INT "_ANDF_size_t"
        ; define size_t is unsigned int
SYM −3 KIND_MODIFIER 0 0 TYPE_UNS_INT "_ANDF_wchar_t"
        ; define wchar_t is unsigned int
SYM −4 KIND_MODIFIER 0 0 TYPE_UNS_INT "_ANDF_ptrdiff_t"
        ; define ptrdiff_t is unsigned int
SYM −5 KIND_MACRO 0 2 "_ANDF_offsetof"
        ; define offsetof macro
SYM −500 KIND_POINTER 0 %1
        ; create a pointer type
LDC TYPE_INT 0
        ; load constant 0
CVT −500
        ; typecast pointer to the structure
IXF %2
        ; create field address
CVT −2
        ; typecast addr. to the size_t type
SYM −5 KIND_END
        ; end offsetof macro
```

The ANDF Installer 218, 228 substitutes negative symbolic id's with appropriate data type definition expansions and object-like and function-like macro expansions by referring, upon encountering a negative symbolic id, to anf.h (in this capacity, the ANDF Installer 218, 228 is acting like a preprocessor). The translation of the above HPcode-Plus Object file 1160 by the ANDF installer 218, 228 is presented below.

```
SYM 401 KIND_STRUCT 1 402 0 "s"
        ; defining structure s
SYM 402 KIND_FIELD TYPE_UNS_INT 403 "i"
        ; defining field i has type = unsigned integer
SYM 403 KIND_FIELD TYPE_UNS_INT 404 "j"
        ; defining field j has type = unsigned integer
SYM 404 KIND_FIELD TYPE_UNS_INT 0 "p"
        ; field p has type unsigned integer
SYM 405 KIND_DVAR 401 0 "x"
        ; defining local variable x as a structure s
SYM 406 KIND_DVAR TYPE_INT 0 "a"
        ; defining local variable a
LDC TYPE_INT 0
        ; expansion of offsetof macro begins
CVT KIND_POINTER 0 401
IXF 403
```

```
CVT TYPE_UNS_INT
        ; end of offsetof macro expansion
CVT TYPE_INT
        ; convert to target type
STR 406
        ; store in "a"
LOD 1
        ; load "_ANDF_NULL"
STR 406
        ; store in "a"
  . .
```

Structure type definitions are similarly handled. For example, the div_t type in <stdlib.h> is defined as follows.

```
typedef struct {
    int quot;
    int rem;
} div_t;
```

The corresponding HPcode-Plus definition in andf.h is presented below.

```
SYM −10 KIND_STRUCT 0 −11 0 "div_t"
        ; define div_t struct
SYM −11 KIND_FIELD TYPE_INT −12 "quot"
        ; define quot field
SYM −12 KIND_FIELD TYPE_INT 0 "rem"
        ; define rem field
```

For the following code:

```
struct div_t x;
. . x.quot . .
```

The Compiler 1122 generates the following HPcode-Plus instructions. Again, these instructions are placed in the HPcode-Plus Object file 1160.

```
SYM 406 KIND-DVAR −10 0 "x"
        ; defining local variable x as a div_t struct
LDA 406
IXF-11
```

```
-continued
ILOD
```

The typedef of div_t may be different on different computer platforms. The ANSI-C standard requires that div_t have two fields, "quot" and "rem", but the order is implementation defined. Since the HPCode-Plus symbolic ids are standardized, however, the ANDF statements to reference the field "x.quot" is the same on all computer platforms. Consider the following div_t definition on a different computer platform:

```
typedef struct {
    int rem;
    int quot;
} div_t;
```

The corresponding ANDF definition in andf.h contains the following statements.

```
SYM -10 KIND_STRUCT 0 -12 0 "div_t"
    ; define div_t struct
SYM -12 KIND_FIELD TYPE_INT -11 "rem"
    ; define rim field
SYM -11 KIND_FIELD TYPE_INT 0 "quot"
    ; define quot field
```

Note that the same HPcode-Plus instructions presented above can be used to reference "x.quot" on this computer platform.

A related issue is that some standard functions are defined as function-like macros on some computer platforms 206, 216, 226 but not on others. The ANSI-C standard allows certain library functions to be implemented either by a real function or a function-like macro. For example, abso can either be a function or a function-like macro.

At the Producer site 206, such library function names must be replaced by unique keywords using function-like macro definitions in the modified ANDF version of the header file. At the Installer site 216, 226, the andf.h file would contain an HPcode-Plus macro expansion for the reserved negative symbolic id (of the unique keyword) defining it either as a function call or as a HPcode-Plus instruction sequence for the local macro definition.

For example, suppose the following function-like macro definition was inserted into the modified ANDF version of macros.h (called Macros.h Modified for reference purposes).

define abs()_ANDF_abs(x)

Assume the Producer 208 maps the unique keyword "_NDF_abs(x)" to the negative symbolic identifier −200.

The compiler intermediate representation 212 which contains the negative symbolic identifier −200 is then distributed to the Install site 216 and the Install Site 226. For the purposes of this example, suppose that the Install Site 216 defines abs as a macro. The Install Site 226 defines abs as a function.

The andf.h file at the Install Site 216 would then contain the following HPcode-Plus macro expansion:
```
SYM -200 KIND_MACRO 01 "_ANDF_abs"
LDC TYPE_INT 0
LOD %1
GEQ
CEVL
LOD %1
CEVL
LOD %1
NEG
CEXP
SYM -200 KIND_END
```

The andf.h file at the Install Site 226 would then contain the following HPcode-Plus macro expansion:
```
SYM -200 KIND_MACRO 0 1 "_ANDF_abs"
MST
LOD %1
PAR
CUP sym_id_for_abs
SYM -206 KIND END
```

3.2. Compiler

As shown in FIG. 11, the Compiler 1122 receives the Preprocessed Source file 1118 as input. The Compiler 1122 translates the expanded machine independent computer program, contained in the Preprocessed Source file 1118, into sequences of HPcode-Plus instructions. These HPcode-Plus instructions are stored in the HPcode-Plus Object file 1160. The HPcode-Plus Object file 1160 contains the compiler intermediate representation 212.

Figure 12:
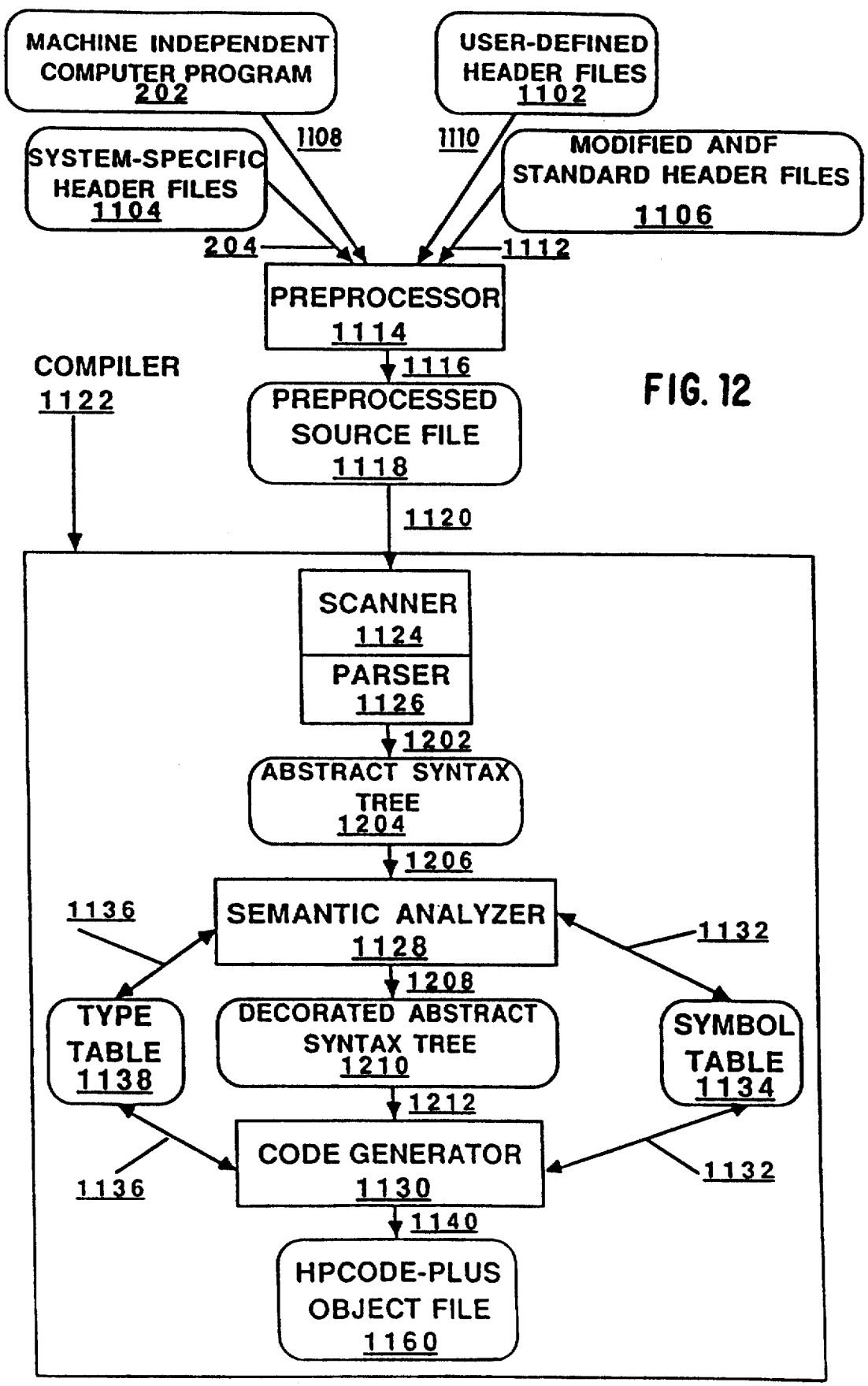
FIG. 12 is a structural and operational block diagram of a preferred embodiment of a compiler component of the ANDF Producer. The square blocks represent modules and the arrows represented operation and data flow.

As presented in FIG. 12, the Compiler 1122 is composed of three stages, a Scanner/Parser 1124, 1126, a Semantic Analyzer 1128, and a Code Generator 1130. These three stages are described in Sections 3.2.1, 3.2.2, and 3.2.3, respectively.

3.2.1. Scanner/Parser

The Scanner/Parser 1124, 1126 builds an abstract syntax tree 1204 (AST) in accordance with tree-building rules which can be specified in the input grammar. The AST 1204 essentially models the structure of the computer program 202 being compiled. The AST 1204 is composed of subtrees which represent declarations, function definitions, statements, expressions, etc.

3.2.2. Semantic Analyzer

As shown in FIG. 12, the Semantic Analyzer 1128 receives the Abstract Syntax Tree 1204 as input.

The Semantic Analyzer 1128 creates a Symbol Table 1134 and a Type Table 1138. The Semantic Analyzer 1128 stores symbolic identifiers, symbolic information, and symbolic kind information from SYM HPcode-Plus instructions in the Symbol Table 1134 and the Type Table 1138.

The Semantic Analyzer 1128 decorates the nodes of the AST 1204 with pointers to appropriate Symbol Table 1134 and Type Table 1138 entries to produce a Decorated Abstract Syntax Tree 1210.

3.2.3. Code Generator

As shown in FIG. 12, the Code Generator 1130 receives the Decorated Abstract Syntax Tree 1210 as input. The Code Generator 1130 writes its results to the HPcode-Plus Object file 1160.

Code generation is performed while traversing the decorated AST. During this traversal, source language (i.e., Pascal, C, Ada, etc.) operations, types, and control constructs are mapped into HPcode-Plus instructions. The recursive tree traversal is performed by visiting the nodes in preorder as shown below:

<Root-node> <leftmost-child node> . . . <rightmost-child node>

The appropriate HPcode-Plus instruction sequence is generated as each node is visited. The basic mapping of ANSI-C to HPcode-Plus is a straightforward process. Most of the expression operators in C have corresponding HPcode-Plus instructions. C control structures are built out of labels and the TJP, FJP, and UJP HPcode-Plus instructions.

The mapping of ANSI-C to HPcode-Plus in an architectural neutral manner is often complex. These complexities are described in the following sections. In reading these sections, it may be helpful to refer to FIGS. 3A through 3D, which present the HPcode-Plus instruction set for ANSI-C.

3.2.3.1. Data Memory Allocation

Data memory allocation is a major problem in producing an architecture neutral distribution format. In traditional compilers 106, frontends 108 allocate memory for data. But since computer platforms have different word sizes, packing algorithms, alignment requirements, and data type representations, data memory allocation by the frontend 108 produces compiler intermediate representations 112 which are not architecturally neutral.

In the present invention, the Code Generator 1130 makes no assumptions on how data objects map into the memory of the target computer platform 216, 226. Instead, data memory allocation is deferred so that word sizes, packing algorithms, storage and alignment requirements, and data type representations are determined by the ANDF Installer 218, 228, rather that the ANDF Producer 208.

The Code Generator 1130 uses the SYM HPcode-Plus instruction to defer data type, variable, and function definition and declaration to the ANDF Installer 218, 228. In deferring such memory allocation tasks to the ANDF Installer 218, 228, the Code Generator 1130 uses the SYM HPcode-Plus instruction to give unique symbolic identifiers to data type identifiers, variable identifiers, and function identifiers.

For example, suppose the machine independent computer program 202 contains the following memory allocation instructions:

int x;
double yo;

x and y are variables. If x is a dynamic variable, then the Code Generator 1130 would use the following SYM command to assign a unique symbolic identifier to x:

SYM 100 KIND_DVAR TYPE_INT 0 "x"

The Code Generator 1130 could then translate memory reference instructions (such as "x=1;" and "z=x+y;") which contain the variable x to HPcode-Plus instructions by using the unique symbolic identifier 100 to refer to x.

Thus, via the SYM HPcode-Plus instruction, the Code Generator 1130 provides memory allocation information to the ANDF Installer 218, 228. The ANDF Installer 218, 228 uses this information to map memory allocation instructions into the memory of the target computer platform 216, 226.

3.2.3.2. Scope, Linkage, and Declaration of Variables

The Code Generator 1130 determines the scope and linkage of variables, providing names for those variables with external linkage. The ANDF Installer 218, 228 assumes that the scoping and linkage specification of the HPcode-Plus Object file 1160 is correct.

The Code Generator 1130 uses the SYM HPcode-Plus instruction to declare variables. Variable types depend on the value of the <symkind> field of the SYM instruction (see FIG. 10). Static storage duration variables (KIND_SVAR), automatic local variables (KIND_DVAR), and parameter variables (KIND_FPARAM) are defined.

If KIND_SVAR variables have external linkage, a visible name is supplied with the SYM declaration.

The Code Generator 1130 also uses the SYM HPcode-Plus instruction to define and declare functions. Function definitions (KIND_FUNCTION) and function declarations (KIND_FUNC_DCL) include visible names if the linkage is external.

The Code Generator 1130 uses the SYM HPcode-Plus instruction to declare data type constructors, such as arrays, structures, and pointers. The KIND_ARRAY, KIND_STRUCT, KIND_UNION, KIND_FIELD, KIND_POINTER, KIND_FUNC_PTR, KIND_ENUM, and KIND_MEMBER declarations specify the constructed C data types. In addition, the "const" and "volatile" C qualifiers are added by using the KIND_MODIFIER declaration.

The basic data types for C are predefined in the HPcode-Plus specification. The Code Generator 1130 is responsible for determining whether a plain char or a plain bit field is signed or not.

3.2.3.3. Constants

3.2.3.3.1. Floating Point and Integer Constants

To avoid problems of different floating-point representations, the Code Generator 1130 represents floating-point constants in HPcode-Plus using the characters provided in the source file 202. The Code Generator 1130 may make minor changes, provided that the changes do not result in any change in interpretation.

For example, if 5.31e1 is a floating-point constant in the source file 202, then the Code Generator 1130 may specify the constant in HPcode-Plus as 5.31E+1. The Code Generator 1130 cannot, however, convert the constant to its internal representation and then output 53.0999995 to the HPCode-Plus Object file 1160.

Similarly, the Code Generator 1130 may change the format of integer constants as long as the semantics remain identical. For example, the Code Generator 1130 may decide to translate all octal constants to their corresponding hexadecimal representations.

In all cases, the Code Generator 1130 must supply floating-point and integer constants to the HPcode-Plus Object file 1160 because the floating point and integer constants may be representable on the target computer platform 216, 226.

3.2.3.3.2. Enumeration Constants

The Code Generator 1130 represents enumeration constants as simple integers. For symbolic debug purposes, however, the Code Generator 1130 may use the KIND_MEMBER symbol declaration to specify enumeration constants.

3.2.3.3.3. Character Constants

The HPcode-Plus Object file 1160 is an ASCII file. Thus, in creating the HPcode-Plus Object file 1160, the Code Generator 1130 represents all ASCII character constants and strings in a natural way. For example, the Code Generator 1130 uses the following command to load the character "a" into the expression stack.

LDC TYPE_CHAR "a"

The Code Generator 1130 represents simple escape sequences by using their equivalent ASCII characters.

The Code Generator 1130 represents octal or hexadecimal escape sequences by using the integer value of the sequences. For example, the Code Generator 1130 uses the following command to load the hexadecimal escape sequence "\xlb" into the expression stack.

LDC TYPE_CHAR 27

The difficulty comes when the source character set has a character that is not representable as an ASCII character (the unrepresentable character is hereinafter referred to as "CH"). One solution that works as long as the ANDF Producer 208 and ANDF Installer 218, 228 are using the same character set is for the Code Generator 1130 to put the value of the character CH (using the character set of the native computer platform 206) into the HPcode-Plus Object file 1160 as an integer. The ANDF Installer 218, 228 would detect the integer and treat it as a character code.

This scheme does not work, however, if the ANDF Producer 208 and ANDF Installer 218, 228 are using different character sets that nevertheless share some characters. In this case, there must be a mechanism to allow the Code Generator 1130 to specify a source character set designator in the HPcode-Plus Object file 1160.

In the present invention, this problem is solved by defining a list of character sets that both the ANDF Producer 208 and the ANDF Installer 218, 228 recognize. For example, if Z' specifies a character set of the native computer platform 206, and character CH has a character code 101 in the Z' character set, then the ANDF Producer 208 represents CH in the HPcode-Plus Object file 1160 as Z'101. This mechanism also works for multi-byte characters.

3.2.3.4. Data Conversions

The data type of a data object may not be readily apparent. For example, in the source code expression:

$$y = x + 37000;$$

the Code Generator 1130 may not know if 37000 is an integer or a long integer.

The Code Generator 1130 uses the CLDC HPcode-Plus instruction to handle those instances when the data type of a large integer constant is not definitely known. In the previous example, the Code Generator 1130 would generate the following HPcode-Plus instruction.

CLDC 0 37000

When mapping this HPcode-Plus instruction to the target computer platform 216, 226, the ANDF Installer 218, 228 would attempt to treat 37000 as an integer. If 37000 cannot be represented as an integer, then the ANDF Installer 218, 228 would treat 37000 as a long integer.

In addition to CLDC, the Code Generator 1130 uses the CVT HPcode-Plus instruction for implicit type conversions, known integral promotions, and known arithmetic conversions. The Code Generator 1130 uses the ICVT HPcode-Plus instruction for integral promotion of operands where the destination type is not known. Also, the Code Generator 1130 uses the ACVT HPcode-Plus instruction for arithmetic conversions where the destination type is not known.

3.2.3.5. Postfix Expressions

The Code Generator 1130 uses the IXE HPcode-Plus instruction for array subscripting. The IXE HPcode-Plus instruction returns the address of an array element. This array element address is then used in subsequent ILOD and ISTR HPcode-Plus instructions (or as the source of another IXE HPcode-Plus instruction in the case of multiple dimension arrays).

The Code Generator 1130 uses MST, CUP, and ICUP HPcode-Plus instructions to map C language function calls. The MST HPcode-Plus instruction marks the expression stack in preparation for a procedure call. The MST HPcode-Plus instructions are paired with CUP (call procedure) or ICUP (indirect call) HPcode-Plus instructions. The Code Generator 1130 must ensure that such pairs are properly nested.

The Code Generator 1130 uses PAR HPcode-Plus instructions to specify parameters for the nearest enclosing MST/CUP or MST/ICUP pair. The Code Generator 1130 is responsible for performing type conversions on parameters before the PAR HPcode-Plus instruction. The Code Generator 1130 uses the IXF HPcode-Plus instruction to reference fields of a structure or union. The Code Generator 1130 uses a combination of DUP, INC, and the load and store HPcode-Plus instructions to map C language increment and decrement operations. For example, the Code Generator 1130 maps the source code expression *p++ to the following HPcode-Plus instructions:

LOD <p>
DUP
INC 1
STR <p>
ILOD

3.2.3.6. Unary Operations

The Code Generator 1130 maps ANSI-C language increment and decrement unary operators in a manner similar to their corresponding postfix operators. The resulting HPcode-Plus instructions are usually simpler since modified values are used (rather than original values).

The Code Generator 1130 uses the LDA HPcode-Plus instruction to map the C language unary & operator.

The Code Generator 1130 uses either the ILOD or ISTR HPcode-Plus instruction to map the C language * operator, depending on whether the result is being used in an expression or being assigned to a variable.

The Code Generator 1130 uses the appropriate integral promotion conversion HPcode-Plus instruction to map the C language unary + operator.

The Code Generator 1130 uses the NEG HPcode-Plus instruction to map the C language unary − operator.

The Code Generator 1130 uses the NOT HPcode-Plus instruction to map the C language ~ HPcode-Plus instruction.

In mapping the C language ! operator, the Code Generator 1130 tests against 0 by using a sequence of HPcode-Plus instructions that are equivalent to !E and (O==E).

The Code Generator 1130 uses the SYM HPcode-Plus instruction to map the C language "sizeof" operator. Following the size of operation, the Code Generator 1130 determines the type of the result.

The Code Generator 1130 uses the CVT HPcode-Plus instruction to map explicit C language cast operations.

3.2.3.7. Other Operators

The Code Generator 1130 uses the MPY, DIV, and REM HPcode-Plus instructions to map the C language multiplicative operators (i.e., *, /, and %). HPcode-Plus defines the semantics of DIV and REM when applied to negative integers to ease implementation by the ANDF Installer 218, 228 and to provide a uniform interface for computer programmers.

The Code Generator 1130 uses the ADD and SUB HPcode-Plus instructions to map the C language additive operators (i.e., +and −). In addition, the Code Generator 1130 uses the HPcode-Plus instructions IXE (al so used in array subscripting), INC, and SUB to map C language pointer arithmetic operations.

The Code Generator 1130 uses the SHFT HPcode-Plus instruction to map the C language shift operators (i.e., and >>). The semantics of the shift, if the shift amount is greater than or equal to the size of the data object, is left to the ANDF Installer 218, 228. HPcode-Plus specifies that negative signed numbers shifted right are sign extended.

The Code Generator 1130 maps the C language relational and equality operators <, >, <=, >=, ==and !=to HPcode-Plus instructions LES, GRT, LEQ, GEQ, EQU and NEQ, respectively.

The Code Generator 1130 maps the C language bitwise operators &&, ∧, and | to HPcode-Plus instructions AND, XOR, and IOR, respectively.

The Code Generator 1130 uses a CEVL HPcode-Plus instruction to separate the conditionally evaluated clauses in the C language conditional evaluation operators (i.e., && and ||). CEVL is used for the same reason for the operator pair ?:. After the clauses are separated, the Code Generator issues the CEXP HPcode-Plus instruction.

The Code Generator 1130 uses HPcode-Plus store instructions (STR, ISTR, INST) to map simple C language assignment statements. The Code Generator 1130 maps compound C language assignment statements by using DUP to duplicate the address of the left hand side (so that it is only evaluated once). Then the binary operation is performed and the result stored.

For example, the Code Generator 1130 generates the following HPcode-Plus instructions to represent the C language statement a[i]+ =j (assuming a is an array of type int):

```
LDA <a>
LOD <i>
IXE TYPE_INT
DUP             duplicate the address of a[i]
ILOD
LOD <j>
ADD
ISTR
```

For the C language comma operator and expressions that only have side-effects (such as p++;), the Code Generator 1130 uses the HPcode-Plus DEL instruction to delete a computed item from the expression stack.

3.2.3.8. Folding of Constant Expressions

The Code Generator 1130 must cautiously perform constant foldings. Constant expressions must be folded using the rules of the target computer platform 216, 226.

For example, overflow will result if the Code Generator 1130 on a 16-bit machine is folding a 20000+20000 signed integer expression.

Another example involves floating-point constant folding. Different computer platforms 206, 216, 226 use different floating-point representations with different precisions. Conversion causes loss of precision.

The third example involves character constant folding. An expression 'a'+5 cannot be folded because 'a' may represent different values on different computer platforms 206, 216, 226.

In general, constant folding decisions (including the values, internal representations, and ranges of constant expressions) should be deferred to the ANDF Installer 218, 228. The Code Generator 1130 may safely perform constant foldings on integer expressions whose values are within the minimum range specified by the ANSI-C. For example, 3+5 is safe.

To defer constant foldings to the ANDF Installer 218, 228, the Code Generator 1130 uses the SYM HPcode-Plus instructions with the KIND_NEW_CONST symbol kind value to assign unique symbolic identifiers to constant expressions. For example, the Code Generator 1130 generates the following HPcode-Plus instructions to represent the C language expression: int i['a'+5],k['a'+5];

```
SYM 401 KIND_NEW_CONST 0
LDC TYPE_INT 'a'
LDC TYPE_INT 5
ADD
SYM 401 KIND_END
SYM 402 KIND_ARRAY 0 #401 TYPE_INT 0
SYM 403 KIND_SVAR 0 402 0 'i'
SYM 404 KIND_SVAR 0 402 0 'k'
```

The unique symbolic identifier 401 represents the expression 'a'+5. Subsequent HPcode-Plus instructions would use the unique symbolic identifier 401 to refer to the constant expression 'a'+5.

3.2.3.9. Initialization

The Code Generator 1130 uses the HPcode-Plus INIT instruction, coupled with the KIND_CONST and KIND_NEW_CONST forms of the SYM HPcode-Plus instruction, for the initialization mechanism. The Code Generator 1130 is responsible for providing a fully-bracketed KIND_CONST specification in the HPcode-Plus Object file 1160.

3.2.3.10. Statements

The Code Generator 1130 uses the HPcode-Plus instructions LAB, TJP, and UJP to map C language labels, conditional branches, and unconditional branches. In addition, the Code Generator 1130 uses the HPCode-Plus instructions CSJP and CTAB to map C language switch statements.

The Code Generator 1130 does not select the manner in which branching is implemented. Instead, the CSJP HPcode-Plus instruction lets the ANDF Installer 218, 228 determine which implementation strategy (e.g. branch table, cascaded-if, binary search, etc.) is "best" for the target computer platform 216, 226.

3.2.3.11. Functions

The Code Generator 1130 uses the SYM HPcode-Plus instruction to define and declare functions. Function definitions (KIND_FUNCTION) and function declarations (KIND_FUNC_DCL) include visible names if the linkage is external.

The Code Generator 1130 uses the HPcode-Plus instructions ENT and END to define function entry and exit points. The Code Generator 1130 uses the RET HPcode-Plus instruction for internal return statements and the STFN HPcode-Plus instruction to specify return values.

3.2.3.12. Example

An example ANSI-C source program and its corresponding translation to HPcode-Plus instructions is shown in FIGS. 14 and 15A through 15E, respectively.

In FIG. 15, variable names, opcode mnemonics, and instruction parameter names are provided for readability. The <stdio.h> file used to compile the ANSI-C source program defined "stdout" to be '&_iob[1]'.

3.3. High-Level Optimizer

As shown in FIG. 11, the High-Level Optimizer 1144 receives the HPcode-Plus Object file 1160 as input. The High-Level Optimizer 1144 reads the HPcode-Plus instructions, computes performance-improving transformations on the HPcode-Plus instructions, and outputs an optimized version of the HPcode-Plus Object file 1160.

The HPcode-Plus compiler intermediate language preserves most of the data flow and control flow information needed by the High-Level Optimizer 1144. The only information obscured are the high-level loop structures, which can be reconstructed through interval analysis.

The HPcode-Plus compiler intermediate language also allows machine independent IL-to-IL optimizations, such as stack height reduction, operator simplification, constant propagation, procedure inlining, redundant definition elimination, and register promotion.

The High-Level Optimizer 1144 can be implemented with varying degrees of sophistication. The scope of the transformations could be confined to individual basic blocks or span procedure boundaries. , There are at least four distinct advantages for having the High-Level Optimizer 1144 separate and independent from the Compiler 1122. If the High-Level Optimizer 1144 is separate, then the High-Level Optimizer 1144 can repeatedly optimize the HPcode-Plus Object file 1160. Repeated optimizations will often expose optimization opportunities that would otherwise be missed (such as redundant definitions).

Second, if the High-Level Optimizer 1144 is separate, the High-Level Optimizer 1144 can be implemented by using compiler optimization technology from other programming languages.

Third, by implementing the High-Level Optimizer 1144 separately, the machine resource utilization for HPcode-Plus production and installation is minimized.

Fourth, optimized HPcode-Plus Object files 1160 are harder to decipher and thus provide an extra degree of protection for proprietary information in the source file 202.

3.4. Archiver/Linker

The Archiver/Linker 1154 archives or concatenates multiple HPcode-Plus object files 1150, 1160 to produce an HPcode-Plus archive file 1158 or a Linked HPcode-Plus file 1170, respectively. The HPcode-Plus object file 1160, the HPcode-Plus archive file 1158, and the Linked HPcode-Plus file 1170 can be distributed to target computer platforms 216, 226.

The Linked HPcode-Plus file 1170 is a concatenation of multiple HPcode-Plus object files 1150, 1160. The Archiver/Linker 1154 is not a linker. It does not resolve unbound references among the HPcode-Plus object files 1150, 1160 being concatenated. Rather, the Archiver/Linker 1154 provides the computer programmer with the convenience of concatenating multiple HPcode-Plus object files 1150, 1160.

At target computer platforms 216, 226, the HPcode-Plus Object files 1150, 1160 concatenated into the Linked HPcode-Plus file 1170 are extracted before installation (by the ANDF Installer 218, 228) and linking (by the native linker). The Archiver/Linker 1154 optionally inserts an OPTN PROGRAM_FILE HPcode-Plus instruction indicating the name to be given to the fully bound program at the install site 216, 226.

The HPcode-Plus archive file 1158 is analogous to the traditional UNIX archive file produced using the "ar" utility. The HPcode-Plus Object files 1160 deposited into the HPcode-Plus archive file are extracted, installed, and archived into a standard library file at the target computer platform 216, 226. The resulting library file is then searched as usual for resolving references by a native linker on the install site 216, 226. All system-specific libraries on the native computer platform 206 used by computer programs 202 must be translated into HPcode-Plus archive files and provided to the target computer platforms 216, 226.

Like the High-Level Optimizer 1144, the Archiver 1154 is high-level language independent.

4. ANDF Installer

Figure 13:
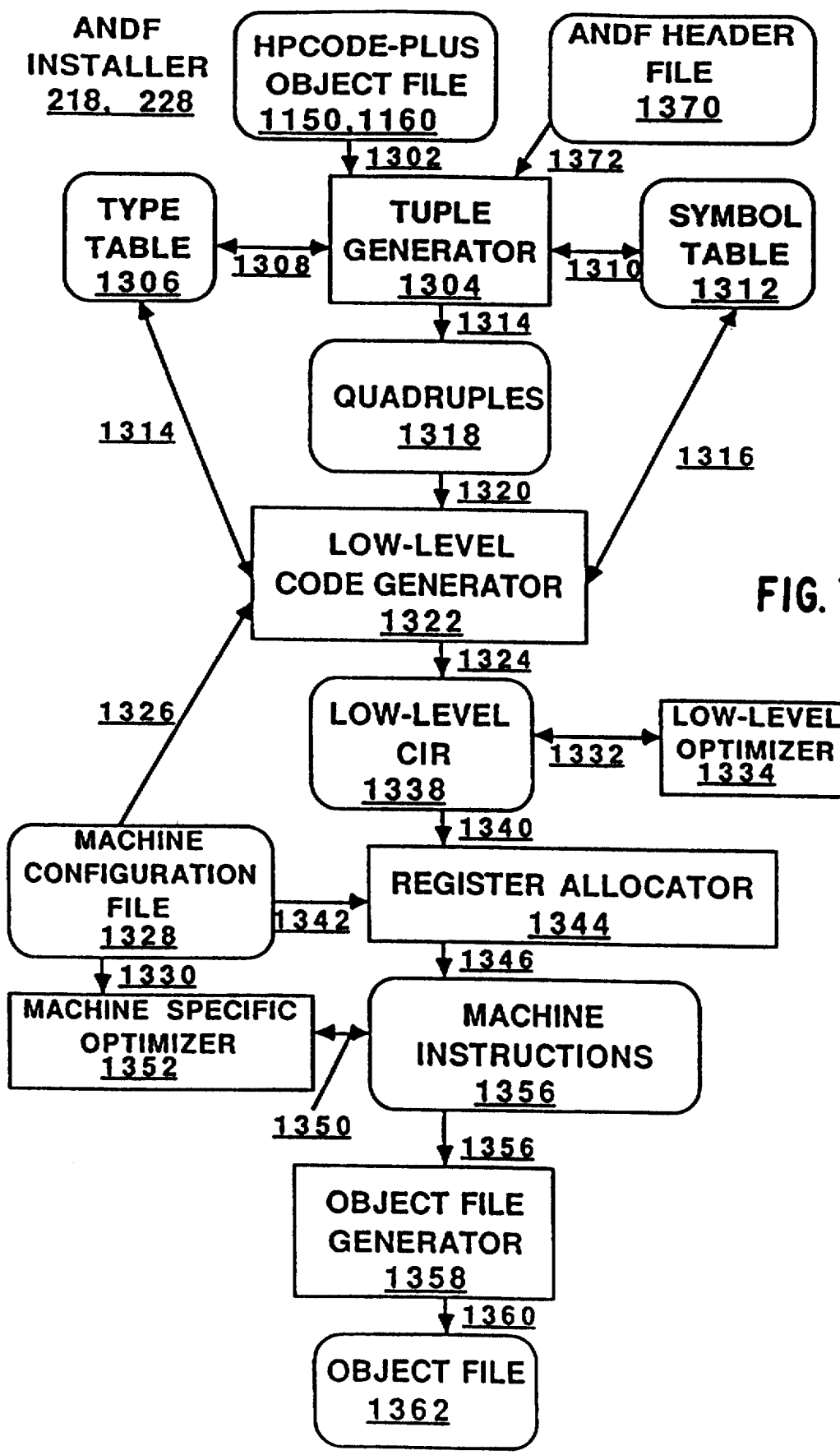
FIG. 13 is a structural and operational block diagram of a preferred embodiment of the ANDF Installer. The square blocks represent modules and the arrows represented operation and data flow.

A high-level block diagram of the ANDF Installer 218, 228 is presented in FIG. 13. In the preferred embodiment of the present invention, the ANDF Installer 218, 228 is composed of four components, a Tuple Generator 1304, a Low-Level Code Generator 1322, a Register Allocator 1344, and an Object File Generator 1358.

HPcode-Plus Archive files 1158 and Linked HPcode-Plus files 1170 in FIG. 11 are distributed from the producer site 206 to the install sites 216, 226. At the install sites 216, 226, the HPcode-Plus Object files 1150, 1160 are extracted. Such extraction can be performed by an additional ANDF Installer component (not shown in FIG. 13), or independent of the ANDF Installer 218, 228 through a standard utility such as the UNIX utility "ar".

Alternatively, the HPcode-Plus Object files 1150, 1160 can be distributed from the producer site 206 to the install sites 216, 226.

In an alternative embodiment of the present invention, the ANDF Installer 218, 228 is composed of six components, the Tuple Generator 1304, the Low-Level Code Generator 1322, a Low-Level Optimizer 1334, the Register Allocator 1344, a Machine Specific Optimizer 1352, and the Object File Generator 1358.

Descriptions of the Tuple Generator 1304, the Low-Level Code Generator 1322, the Low-Level Optimizer 1334, the Register Allocator 1344, the Machine Specific Optimizer 1352, and the Object File Generator 1358 are presented in the following sections.

Actual implementation of these ANDF Installer components depends on the particular architecture of each target computer platform 216, 226. Thus, the following descriptions were written at a high-level so that they would be useful as a guide for implementation on a variety of target computer platforms 216, 226.

4.1. Tuple-Generator

The Tuple Generator 1304 reads HPcode-Plus instructions from the HPCode-Plus Object file 1150, 1160. The Tuple Generator 1304 translates HPcode-Plus instructions, which operate on the HPcode-Plus virtual machine, into a linear list of machine independent quadruples 1318.

HPcode-Plus instructions pop their operands from and push their results to the expression stack. Thus, HPcode-Plus instructions are stack-based instructions.

The primary difference between HPcode-Plus instructions and the quadruples 1318 is that the implicit operands of the stack-based HPcode-Plus instructions are explicitly expressed as operands of the quadruples 1318.

In its simplest form, the quadruples 1318 have the following format:

<opcode> <src1> <src2> <tgt>

In general, <opcode> specifies a non-SYM HPcode-Plus opcode. <src1>, <src2>, and <tgt> specify the operands of the quadruple. Specifically, <src1> and <src2> specify source operands and <tgt> specifies a target operand.

Interpretation of the quadruple operands depend on the value of <opcode>. For example, a UJP quadruple has no source operands and the target operand is the label identifying the branch destination. Also, some HPcode-Plus instructions do not translate into quadruples (e.g., DEL) while others may translate into multiple quadruples (e.g., MCAL).

To translate HPcode-Plus instructions into the quadruples 1318, the Tuple Generator 1304 models the expression stack. Each HPcode-Plus instruction pushes or pops values from the expression stack. The Tuple Generator 1304 determines the value of quadruple operands by identifying those expression stack elements which would be referenced by the HPcode-Plus instruction in question.

In addition to quadruple generation, the Tuple Generator 1304 builds a Symbol Table 1312 and a Type Table 1306. The Tuple Generator 1304 enters items into these tables while processing HPcode-Plus SYM instructions.

The Symbol table 1312 contains entries for variables, function definitions and declarations, function formal parameters, constants, and macros defined by SYM instructions as well as labels defined using the LAB instruction. The folding of constant expressions is completed at this point. That is, the Tuple Generator 1304 evaluates constant expressions (defined using the KIND_NEW_CONST SYM instruction) before entering the constants into the Symbol Table 1312. The Tuple Generator 1304 also enters into the Symbol Table 1312 those temporaries which are produced by operations on the expression stack.

The Type Table 1306 contains entries for the various data type and structure field SYMs as well as the predefined data types supported by HPcode-Plus. Quadruple operands can be represented by pointers to the corresponding Symbol Table entries. Symbol Table entries in turn reference the appropriate Type Table entries.

While generating quadruples, the Tuple Generator 1304 uses the Symbol Table 1312 to complete the expansion of object-like macros and function-like macros (as described above).

The Symbol Table 1312 and the Type Table 1306 are extensively used by the Low-Level Code Generator 1322 for memory allocation and instruction selection.

By doing quadruple generation and low-level code generation on a procedure by procedure basis, the ANDF Installer 218, 228 can delete those entries in the Symbol Table 1312 and the Type Table 1306 that have inaccessible scopes. In particular, the Symbol Table entries for variables and types local to a function can be removed after code for that function has been generated.

4.2. Low-Level Code Generator

The Low-Level Code Generator 1322 is invoked after the quadruples 1318 are generated for each HPcode-Plus instruction in the HPcode-Plus Object file 1150, 1160. It receives the Quadruples 1318 as input and produces a Low-Level Compiler Intermediate Representation 1338 (hereinafter referred to as the Low-Level CIR).

The Low-Level CIR 1338 is analogous to the compiler intermediate representation 212 that is produced by the Code Generator 1130 and stored in the HPcode-Plus Object file 1160. The Low-Level CIR 1338, however, is not architecturally neutral. Instead, the Low-Level CIR 1138 is dependent upon the particular architecture of the target computer platform 216, 226.

Specifically, the Low-Level Code Generator 1322 translates the machine independent quadruples 1318 into a machine specific compiler intermediate representation 1338. As part of this translation process, the Low-Level Code Generator 1322 performs the following tasks.

4.2.1. Instruction Selection

The Low-Level Code Generator 1322 selects a sequence of instructions from the target computer platform's instruction set to represent each quadruple 1318.

While selecting instructions, the Low-Level Code Generator 1322 considers a number of factors, such as the alignment restrictions of the target computer platform 216, 226 and the desired exception handling behavior. The actual configuration of the target computer platform 216, 226 also impacts instruction selection. This is especially true when dealing with different implementations of a single architecture such as the Motorola MC680xx family.

The Low-Level Code Generator 1322 uses a Machine Configuration file 1328 to solve this problem. The precise contents of this file are architecture specific, and include register file sizes, coprocessor availability, and instruction cycle times.

The Low-Level Code Generator 1322 must effectively use the target machine's instruction set to ensure good code quality. Reduced Instruction Set Computer (RISC) architectures, for example, require shorter instruction sequences for better code quality. Conversely, for CISC computer platforms, where instructions have differing cycle times, short instruction sequences may not produce the most efficient code. Thus, generating optimal code sequences for any architecture is a complicated task which is highly dependent on the operands used. Thus, the Low-Level Code Generator 1322 may use a table driven approach.

4.2.2. Memory Allocation

With the HPcode-Plus compiler intermediate language, memory allocation is perfomed by the ANDF Installer 218, 228 rather than the ANDF Producer 208. Specifically, the Low-Level Code Generator 1322 of the ANDF Installer 218, 228 performs memory allocation.

The Low-Level Code Generator 1322 uses the Symbol Table 1312 and the Type Table 1306 to bind data objects to the target computer's physical memory. Specifically, the Low-Level Code Generator 1322 binds automatic variables (defined using DVAR HPcode-Plus SYM instructions) to specific locations on the current activation frame (i.e., stack-pointer relative offsets). Likewise, private global and static local variables are bound to specific locations in the global data area.

An implicit prerequisite to memory allocation is the mapping of the predefined HPcode-Plus data types to the target computer platform's data types. When laying out variables in memory, the Low-Level Code Generator 1322 must consider the target computer platform's alignment restrictions for the native data types.

For instance, on some computer platforms the Low-Level Code Generator 1322 might be required to align a TYPE_LONGREAL variable (represented as a double word floating-point object) on a double-word boundary.

Additionally, the Low-Level Code Generator 1322 must consider the packing attributes specified with KIND_STRUCT variables, as this could dictate the manner in which the structure and fields are laid out in memory.

The Low-Level Code Generator 1322 must also assign character values to character constants in the HPcode-Plus Object file 1150, 1160. The character values are from an execution character set of the Install site 216, 226. For example, suppose the Low-Level Code Generator 1322 locates the character constant Z'101 in the HPcode-Plus Object file 1150, 1160. Z indicates the execution character set, and 101 identifies a character within the Z execution character set. The Low-Level Code Generator 1322 then exchanges the value for character 101 in the Z character set for occurrences of Z'101 in the HPcode-Plus Object field 1150, 1160.

4.2.3. Symbolic Debug Support

If the symbolic debug option is specified (via the OPTN HPcode-Plus instruction), then the Low-Level Code Generator 1322 writes additional information to the Low-Level CIR 1338. This information is subsequently written to an Object File 1362 by the Object File Generator 1358. The information is then used by the native computer platform's symbolic debugger.

The exact nature and format of this information is dependent on the requirements of the native symbolic debugger. In general, the information would include the information contained in the Symbol table 1312 and Type table 1306.

4.2.4. Optimization Support

The Low-Level Code Generator 1322 may provide support for subsequent optimization and register allocation phases. For example, the Low-Level Code Generator 1322 may perform either limited interprocedural dataflow analysis or procedure in lining.

4.2.5. Object File Management

The Low-Level Code Generator 1322 also performs object file management tasks. These tasks may be shared with the Object File Generator 1358.

Specifically, the Low-Level Code Generator 1322 arranges for the import and export of global variables and functions. The Low-Level Code Generator 1322 produces relocation requests to identify symbolic references to imported global variables and functions to the native linker. Also, the Low-Level Code Generator 1322 identifies exported global variables and functions to the native linker so that references in other compilation units can be resolved.

The Low-Level Code Generator 1322 organizes and identifies data areas that correspond to uninitialized global memory (BSS), initialized global memory, and literal memory. To do this, the Low-Level Code Generator 1322 processes HPcode-Plus INIT instructions, as well as SVAR Symbol Table entries.

The Low-Level Code Generator 1322 processes all other miscellaneous HPcode-Plus options that are specified. Examples of options specified using the OPTN HPcode-Plus instruction include:
ASSEMBLER FILE
COMPILATION
COPYRIGHT
USER VERSION
INIT

4.3. Low-Level Optimizer

The Low-Level Optimizer 1334 performs low-level optimizations on the low-level compiler intermediate representation 1338 produced by the Low-Level Code Generator 1322. Ideally, the optimizations performed by the Low-Level Optimizer 1334 do not include those machine independent optimizations that could have been performed by the High-Level Optimizer 1144 of the ANDF Producer 208. Instead, the Low-Level Optimizer 1334 performs appropriate preregister allocation (possibly architecture-specific) optimizations.

4.4. Register Allocator

The Register Allocator 1344 receives the optimized Low-Level CIR 1338 as input and produces Machine Instructions 1348.

The Register Allocator 1344 maps the register requirements expressed in the low-level compiler intermediate representation 1338 into the register set of the target computer platform 216, 226. For most computer architectures, efficient register allocation dramatically influences run-time performance of the generated code. The Register Allocator can be implemented using priority-based graph coloring techniques.

4.5. Machine Specific Optimizer

The Machine Specific Optimizer 1352 performs all post-register allocation optimizations, such as peephole optimizations (which exploit the special features of computer platforms) and instruction scheduling.

4.6. Object File Generator

The Object File Generator 1358 receives the Machine Instructions 1348 as input. The Object File Generator 1358 generates and stores object code in an Object file 1362. The object code is packed into the precise bit patterns expected by the underlying hardware.

The Object File Generator 1358 writes other required information to the Object file 1362 according to the format expected by the native linker and loader. This might include Symbol Table 1312 and Type Table 1306 information, relocation information, and object file management information.

The Object File 1362 produced by the Object File Generator 1358 is then linked (using the target computer platform's native linker, not shown in FIG. 13) with other object files and system libraries to produce an executable program (not shown in FIG. 13).

It should be noted that the preferred embodiment of the ANDF Installer 218, 228 described above is directed to register-based heterogeneous computer platforms. As will be obvious to one with ordinary skill in the art, the improvements of the present invention as described above can also be applied to stack-based heterogeneous computer platforms. For example, an ANDF Installer 218, 228 for stack-based heterogeneous computer platforms may contain only the code generator 1322 and the object file generator 1358. The code generator 1322 would directly receive the HPcode-Plus object file to produce machine instructions. The object file generator 1358 would receive the machine instructions to produce object code.

We claim:

1. One or more installer systems, adapted for use with a machine independent computer program, each of said one or more installer systems comprising:

a computer platform from a set comprising one or more heterogeneous computer platforms, said one or more heterogeneous computer platforms having machine configuration files, register architectures, memory architectures, and instruction sets which are machine dependent on said one or more heterogeneous computer platforms;

a tuple-generator operating on said computer platform, which receives an ANDF header file and a compiler intermediate representation of the machine independent computer program as input, said compiler intermediate representation comprising compiler intermediate instructions from a compiler intermediate language, said compiler intermediate representation being machine independent and representing an architecture neutral distribution format, wherein said tuple-generator translates said compiler intermediate instructions in said compiler intermediate representation into quadruple instructions;

a low-level code generator operating on said computer platform, which receives said quadruple instructions and the machine configuration file as input and which translates said quadruple instructions into low-level instructions, said low-level instructions being from the instruction set, said low-level instructions being stored in a low-level compiler intermediate representation;

a register allocator operating on said computer platform, which receives said low-level compiler intermediate representation and the machine configuration file as input and which maps said low-level instructions to the register architecture to produce machine instructions;

an object file generator operating on said computer platform, which receives said machine instructions as input and which generates an object code representation of the machine independent computer program, said object code representation being in an object code file;

wherein said tuple generator, said low-level code generator, said register allocator, and said object file generator operate in a machine dependent manner according to said compiler intermediate language; and wherein said object code representation is machine dependent upon the one or more heterogeneous computer platforms.

2. One or more installer systems, adapted for use with a machine independent computer program, each of said one or more installer systems comprising:

a computer platform from a set comprising one or more heterogeneous computer platforms, said one or more heterogeneous computer platforms having machine configuration files, register architectures, memory architectures, and instruction sets which are machine dependent on said one or more heterogeneous computer platforms;

a tuple-generator operating on said computer platform, which receives an ANDF header file and a compiler intermediate representation of the machine independent computer program as input, said compiler intermediate representation comprising HPcode-Plus instructions from an HPcode-Plus compiler intermediate language, said compiler intermediate representation being machine independent and representing an architecture neutral distribution format, wherein said tuple-generator translates said HPcode-Plus instructions in said compiler intermediate representation into quadruple instructions;

a low-level code generator operating on said computer platform, which receives said quadruple instructions and the machine configuration file as input and which translates said quadruple instructions into low-level instructions, said low-level instructions being from the instruction set, said low-level instructions being stored in a low-level compiler intermediate representation;

a register allocator operating on said computer platform, which receives said low-level compiler intermediate representation and the machine configuration file as input and which maps said low-level instructions to the register architecture to produce machine instructions;

an object file generator operating on said computer platform, which receives said machine instructions as input and which generates an object code representation of the machine independent computer program, said object code representation being stored in an object code file;

wherein said tuple-generator, said low-level code generator, said register allocator, and said object file generator operate in a machine dependent manner according to said HPcode-Plus compiler intermediate language; and wherein said object code representation is machine dependent upon said one or more heterogeneous computer platforms.

3. The installer of claim 2, wherein said tuple generator comprises:

(1) means for locating macro, function, and variable definition and declaration SYM HPcode-Plus instructions in said compiler intermediate representation, said SYM HPcode-Plus instructions used for creating and assigning unique symbolic identifiers to macros, functions, and variables, said SYM HPcode-Plus instructions having a syntax SYM <symid> <sym knid> <sym info> wherein
<symid> is a field which represents one of said unique symbolic identifiers and which uniquely identifies an item;
<sym kind> is a field which contains symbolic kind information that describes said item and which can have at least values KIND_MACRO, KIND_FUNCTION, KIND_FUNC_DCL, KIND_FPARAM, KIND_SVAR, and KIND_DVAR;
<sym info> is a field which contains symbolic information that further describes said item;
wherein said item represents one of said macros, functions, and variables;
(2) means for creating a symbol table, said symbol table comprising symbol table entries for unique symbolic identifiers assigned to said macros, functions, and variables;
(3) means for storing in said symbol table entries said symbolic information from said SYM HPcode-Plus instructions used for creating and assigning said unique symbolic identifiers to said macros, functions, and variables.

4. The installer system of claim 3, said tuple generator further comprising:
(1) means for locating data type definition SYM HPcode-Plus instructions in said compiler intermediate representation, said SYM HPcode-Plus instructions used for creating and assigning unique symbolic identifiers to data types, wherein said item represents one of said data types;
(2) means for creating a type table, said type table comprising type table entries for said unique symbolic identifiers assigned to said data types;
(3) means for storing in said type table entries said symbolic information from said SYM HPcode-Plus instructions used for creating and assigning said data types.

5. The installer system of claim 4, wherein said tuple generator further comprises:
(1) means for locating and evaluating constant expressions in said compiler intermediate representation to produce evaluated constant expressions, said constant expressions being represented by sequences of HPcode-Plus instructions which are identified by unique symbolic identifiers, said evaluated constant expressions being machine dependent upon the one or more heterogeneous computer platforms;
(2) means for storing in said symbol table entries said evaluated constant expressions and said unique symbolic identifiers which are associated with said constant expressions.

6. The installer system of claim 5, wherein said low-level code generator comprises:
(1) means for mapping said macros, functions, and variables to the memory architecture of the one or more heterogeneous computer platforms by referring to the machine configuration file and to said symbol table;
(2) means for mapping said data types to the memory architecture of the one or more heterogeneous computer platforms by referring to the machine configuration file and to said type table.

7. The installer system of claim 2, wherein said tuple generator further comprises:
(1) means for locating HPcode-Plus instructions having unique negative symbolic identifiers in said compiler intermediate representation;
(2) means for accessing said ANDF header files, said ANDF header files being related to the machine dependent standard header files and comprising data type definitions and macro definitions which correspond to said unique negative symbolic identifiers, said data type definitions and said macro definitions being defined by and machine dependent upon the one or more heterogeneous computer platforms;
(3) means for replacing said unique negative symbolic identifier with said data type definitions and said macro definitions.

8. The installer system of claim 2, further adapted for use with an ANSI-C computer programming language, wherein said low-level code generator further comprises:
(1) means for locating CLDC HPcode-Plus instructions in said compiler intermediate representation, said CLDC HPcode-Plus instructions having a syntax:

CLDC <flag> <constant value> wherein
<flag> indicates a data type set, said data type set comprising one or more data types, said one or more data types being organized sequentially from a first data type to a last data type;
<constant value> is a field comprising a constant value with an indeterminate data type;
(2) means for assigning a data type to said <constant value>, said data type being from said data type set indicated by said <flag>, wherein said assigning means operates according to the ANSI-C computer programming language to assign said data type to said <constant value>.

9. The installer system of claim 2, wherein said low-level code generator further comprises:
(1) means for locating ICVT HPcode-Plus instructions in said compiler intermediate representation, said ICVT HPcode-Plus instructions operating to perform integral promotions upon operands for integral promotion in said compiler intermediate representation;
(2) means for performing said integral promotions upon said operands for integral promotion according to said ICVT HPcode-Plus instructions and the ANSI-C computer programming language.

10. The installer system of claim 2, wherein said low-level code generator further comprises:
(1) means for locating ACVT HPcode-Plus instructions in said compiler intermediate representation, said ACVT HPcode-Plus instructions operating to convert operands for arithmetic operations in said compiler intermediate representation to a common data type;
(2) means for converting said operands for arithmetic operations to said common data type according to said ACVT HPcode-Plus instructions and the ANSI-C computer programming language.

11. The installer system of claim 2, wherein said low-level code generator further comprises:
  (1) means for locating character constants in said compiler intermediate representation, each of said character constants comprising:
    (a) a first part, said first part identifying a first character set; and
    (b) a second part, said second part identifying said character constant within said first character set;
  (2) means to assign character constant values to said character constants, said character constant values being from an execution character set of the one or more heterogeneous computer platforms, said execution character set being machine dependent on the one or more heterogeneous computer platforms.

12. The installer system of claim 2, said installer system further comprising:
  (1) a low-level optimizer for optimizing said low-level instructions to produce optimized low-level instructions, said optimized low-level instructions being stored in said low-level compiler intermediate representation;
  (2) a machine specific optimizer for optimizing said machine instructions to produce optimized machine instructions;
  wherein said low-level optimizer and said machine specific optimizer operate in a machine dependent manner.

13. One or more interpreter systems, adapted for use with a machine independent computer program, each of said one or more interpreter system comprising:
  a computer platform from a set comprising one or more heterogeneous computer platforms;
  means, operating on the computer platform, for receiving a compiler intermediate representation of the machine independent computer program, said compiler intermediate representation comprising HPcode-Plus instructions from an HPcode-Plus compiler intermediate language, said compiler intermediate representation being machine independent and representing an architecture neutral distribution format;
  means, operating on the computer platform, for executing said HPcode-Plus instructions contained in said compiler intermediate representation without converting said compiler intermediate representation to object code representations of the machine independent computer program.

14. An installer method, adapted for use with a machine independent computer program and one or more heterogeneous computer platforms having machine configuration files, register architectures, memory architectures, and instruction sets which are machine dependent on the one or more heterogeneous computer platforms, said installer method comprising the steps of:
  (a) a tuple-generator step for receiving a compiler intermediate representation of the machine independent computer program as input, said compiler intermediate representation comprising compiler intermediate instructions from a compiler intermediate language, said compiler intermediate representation being machine independent and representing an architecture neutral distribution format, wherein said tuple-generator step translates said compiler intermediate instructions in said compiler intermediate representation into quadruple instructions;
  (b) a low-level code generator step for receiving said quadruple instructions and the machine configuration file as input and for translating said quadruple instructions into low-level instructions, said low-level instructions being from the instruction set, said low-level instructions being stored in a low-level compiler intermediate representation;
  (c) a register allocator step for receiving said low-level compiler intermediate representation and the machine configuration file as input and for mapping said low-level instructions to the register architecture to produce machine instructions;
  (d) an object file generator step for receiving said machine instructions as input and for generating an object code representation of the machine independent computer program, said object code representation being stored in an object code file;
  wherein said tuple-generator step, said low-level code generator step, said register allocator step, and said object file generator step operate in a machine dependent manner according to said compiler intermediate language; and
  wherein said object code representation is machine dependent upon the one or more heterogeneous computer platforms.

15. An installer method, adapted for use with a machine independent computer program and one or more heterogeneous computer platforms having machine configuration files, register architectures, memory architectures, and instruction sets which are machine dependent on the one or more heterogeneous computer platforms, said installer comprising the steps of:
  (a) a tuple-generator step for receiving an ANDF header file and a compiler intermediate representation of the machine independent computer program as input, said compiler intermediate representation comprising HPcode-Plus instructions from an HPcode-Plus compiler intermediate language, said compiler intermediate representation being machine independent and representing an architecture neutral distribution format, wherein said tuple-generator step translates said compiler intermediate instructions in said compiler intermediate representation into quadruple instructions;
  (b) a low-level code generator step for receiving said quadruple instructions and the machine configuration file as input and for translating said quadruple instructions into low-level instructions, said low-level instructions being from the instruction set, said low-level instructions being stored in a low-level compiler intermediate representation;
  (c) a register allocator step for receiving said low-level compiler intermediate representation and the machine configuration file as input and for mapping said low-level instructions to the register architecture to produce machine instructions;
  (d) an object file generator step for receiving said machine instructions as input and for generating an object code representation of the machine independent computer program, said object code representation being stored in an object code file;
  wherein said tuple-generator step, said low-level code generator step, said register allocator step, and said object file generator step operate in a machine dependent manner according to said HPcode-Plus compiler intermediate language; and wherein said object code representation is machine dependent upon the one or more heterogeneous computer platforms.

16. The installer method of claim 15, wherein said tuple generator step comprises the steps of:

(a) locating macro, function, and variable definition and declaration SYM HPcode-Plus instructions in said compiler intermediate representation, said SYM HPcode-Plus instructions used for creating and assigning unique symbolic identifiers to macros, functions, and variables, said SYM HPcode-Plus instructions having a syntax SYM <symid> <sym kind> <sym info> wherein
<symid> is a field which represents one of said unique symbolic identifiers and which uniquely identifies an item;
<sym kind> is a field which contains symbolic kind information that describes said item and which can have at least values KIND_MACRO, KIND_FUNCTION, KIND_FUNC_DCL, KIND_FPARAM, KIND_SVAR, and KIND_DVAR;
<sym info> is a field which contains symbolic information that further describes said item;
wherein said item represents one of said macros, functions, and variables;

(b) creating a symbol table, said symbol table comprising symbol table entries for unique symbolic identifiers assigned to said macros, functions, and variables;

(c) storing in said symbol table entries said symbolic information from said SYM HPcode-Plus instructions used for creating and assigning said unique symbolic identifiers to said macros, functions, and variables.

17. The installer method of claim 16, said tuple generator step further comprising the steps of:

(a) locating data type definition SYM HPcode-Plus instructions in said compiler intermediate representation, said SYM HPcode-Plus instructions used for creating and assigning unique symbolic identifiers to data types, wherein said item represents one of said data types;

(b) creating a type table, said type table comprising type table entries for said unique symbolic identifiers assigned to said data types;

(c) storing in said type table entries said symbolic information from said SYM HPcode-Plus instructions used for creating and assigning said data types.

18. The installer method of claim 17, wherein said tuple generator step further comprises the steps of:

(a) locating and evaluating constant expressions in said compiler intermediate representation to produce evaluated constant expressions, said constant expressions being represented by sequences of HPcode-Plus instructions which are identified by unique symbolic identifiers, said evaluated constant expressions being machine dependent upon the one or more heterogeneous computer platforms;

(b) storing in said symbol table entries said evaluated constant expressions and said unique symbolic identifiers which are associated with said constant expressions.

19. The installer method of claim 18, wherein said low-level code generator step comprises the steps of:

(a) mapping said macros, functions, and variables to the memory architecture of the one or more heterogeneous computer platforms by referring to the machine configuration file and to said symbol table;

(b) mapping said data types to the memory architecture of the one or more heterogeneous computer platforms by referring to the machine configuration file and to said type table.

20. The installer method of claim 15, wherein said tuple generator step further comprises the steps of:

(a) locating HPcode-Plus instructions having unique negative symbolic identifiers in said compiler intermediate representation;

(b) accessing said ANDF header files, said ANDF header files being related to the machine dependent standard header files and comprising data type definitions and macro definitions which correspond to said unique negative symbolic identifiers, said data type definitions and said macro definitions being defined by and machine dependent upon the one or more heterogeneous computer platforms;

(c) replacing said unique negative symbolic identifiers with said data type definitions and said macro definitions.

21. The installer method of claim 15, further adapted for use with an ANSI-C computer programming language, wherein said low-level code generator step further comprises the steps of:

(a) locating CLDC HPcode-Plus instructions in said compiler intermediate representation, said CLDC HPcode-Plus instructions having a syntax:

CLDC <flag> <constant value> wherein
<flag> indicates a data type set, said data type set comprising one or more data types, said one or more data types being organized sequentially from a first data type to a last data type;
<constant value> is a field comprising a constant value with an indeterminate data type;

(b) assigning a data type to said <constant value>, said data type being from said data type set indicated by said <flag>, wherein said assigning means operates according to the ANSI-C computer programming language to assign said data type to said <constant value>.

22. The installer method of claim 15, wherein said low-level code generator step further comprises the steps of:

(a) locating ICVT HPcode-Plus instructions in said compiler intermediate representation, said ICVT HPcode-Plus instructions operating to perform integral promotions upon operands for integral promotion in said compiler intermediate representation;

(b) performing said integral promotions upon said operands for integral promotion according to said ICVT HPcode-Plus instructions and the ANSI-C computer programming language.

23. The installer method of claim 15, wherein said low-level code generator step further comprises the steps of:

(a) locating ACVT HPcode-Plus instructions in said compiler intermediate representation, said ACVT HPcode-Plus instructions operating to convert operands for arithmetic operations in said compiler intermediate representation to a common data type;

(b) converting said operands for arithmetic operations to said common data type according to said ACVT HPcode-Plus instructions and the ANSI-C computer programming language.

24. The installer method of claim 15, wherein said low-level code generator step further comprises the steps of:
   (a) locating character constants in said compiler intermediate representation, each of said character constants comprising:
      (1) a first part, said first part identifying a first character set; and
      (2) a second part, said second part identifying said character constant within said first character set;,
   (b) assigning character constant values to said character constants, said character constant values being from an execution character set of the one or more heterogeneous computer platforms, said execution character set being machine dependent on the one or more heterogeneous computer platforms.

25. The installer method of claim 15, said installer method further comprising the steps of:
   (a) a low-level optimizer step for optimizing said low-level instructions to produce optimized low-level instructions, said optimized low-level instructions being stored in said low-level compiler intermediate representation;
   (b) a machine specific optimizer step for optimizing said machine instructions to produce optimized machine instructions;
   wherein said low-level optimizer step and said machine specific optimizer step operate in a machine dependent manner.

26. One or more interpreter methods, adapted for use with a machine independent computer program and one or more heterogeneous computer platforms, each of said one or more interpreter methods comprising the steps of:
   (a) receiving a compiler intermediate representation of the machine independent computer program, said compiler intermediate representation comprising HPcode-Plus instructions from an HPcode-Plus compiler intermediate language, said compiler intermediate representation being machine independent and representing an architecture neutral distribution format;
   (b) executing said HPcode-Plus instructions contained in said compiler intermediate representation without converting said compiler intermediate representation to object code representations of the machine independent computer program.

* * * * *